US008776763B2

(12) United States Patent
Omori et al.

(10) Patent No.: US 8,776,763 B2
(45) Date of Patent: Jul. 15, 2014

(54) INTERNAL COMBUSTION ENGINE CONTROLLER

(75) Inventors: Chikara Omori, Hitachinaka (JP);
Ryoichi Oura, Hitachinaka (JP);
Mitsuhiko Watanabe, Odawara (JP);
Takuya Mayuzumi, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 1184 days.

(21) Appl. No.: 12/708,379

(22) Filed: Feb. 18, 2010

(65) Prior Publication Data

US 2010/0242920 A1 Sep. 30, 2010

(30) Foreign Application Priority Data

Mar. 26, 2009 (JP) ................. 2009-077442

(51) Int. Cl.
*G01R 19/00* (2006.01)

(52) U.S. Cl.
USPC .......... 123/490; 123/445; 73/114.45; 702/64; 701/102

(58) Field of Classification Search
USPC .......... 123/445, 456, 472, 475, 476, 478, 480, 123/483, 485, 487, 490; 73/114.45, 114.47, 73/114.48, 114.49; 702/64; 701/102, 103, 701/104, 105
See application file for complete search history.

(56) References Cited

U.S. PATENT DOCUMENTS 5,844,786 A * 12/1998 Yoshida et al. ............ 363/21.01
6,250,286 B1 * 6/2001 Hoenig et al. ................ 123/490
6,390,082 B1 * 5/2002 Duffy et al. .................... 123/682
6,785,112 B2 * 8/2004 Reischl et al. ................. 361/154
6,963,498 B2 * 11/2005 Nadd ............................. 363/26

(Continued)

FOREIGN PATENT DOCUMENTS

DE 198 33 830 A1 2/2000
EP 1396630 A2 * 3/2004 ............. F02D 41/38

(Continued)

OTHER PUBLICATIONS

Japanese Office Action dated Apr. 19, 2011 (Three (3) pages).

(Continued)

*Primary Examiner* — Stephen K Cronin
*Assistant Examiner* — Raza Najmuddin
(74) *Attorney, Agent, or Firm* — Crowell & Moring LLP

(57) ABSTRACT

There is provided an internal combustion engine controller that realizes a reduction in maximum current value and current regulation without sacrificing boost performance. An internal combustion engine controller 100 comprises: a boost coil 101 configured to boost a voltage VB of a battery power source; a boost switch element 106 configured to switch between causing a current to flow and stopping a current from flowing through the boost coil 101; and a current detection portion 126 configured to detect a current flowing through the boost switch element 106, wherein boost control is effected by repeating the switching of the switch element, the voltage boosted at the boost coil 101 is charged to a boost capacitor 103 via a diode 104, and, during the boost control, the internal combustion engine controller 100 makes the boost switch element 106 stop the current flowing through the boost coil 101 when the detected current reaches a switching stop current value and, after a predetermined set time Tdown has elapsed from the point at which current flow is stopped, makes the boost switch element 106 cause a current to flow through the boost coil 101.

15 Claims, 16 Drawing Sheets

(56) References Cited

U.S. PATENT DOCUMENTS

| | | | |
|---|---|---|---|
| 7,117,852 B2* | 10/2006 | Santero et al. | 123/490 |
| 7,497,206 B2* | 3/2009 | Kemmer | 123/490 |
| 8,081,498 B2* | 12/2011 | Mayuzumi et al. | 363/59 |
| 8,214,132 B2* | 7/2012 | Bunni et al. | 701/106 |
| 2002/0189593 A1* | 12/2002 | Yamakado et al. | 123/490 |
| 2003/0062029 A1 | 4/2003 | Oyama et al. | |
| 2005/0047053 A1 | 3/2005 | Meyer et al. | |
| 2006/0075994 A1* | 4/2006 | Santero et al. | 123/490 |
| 2008/0017172 A1* | 1/2008 | Kojima | 123/478 |
| 2008/0289607 A1* | 11/2008 | Mayuzumi et al. | 123/490 |
| 2008/0319584 A1* | 12/2008 | Fischer et al. | 700/282 |
| 2009/0015223 A1 | 1/2009 | Kakehi | |
| 2009/0159047 A1* | 6/2009 | Eto et al. | 123/435 |
| 2009/0183714 A1 | 7/2009 | Mayuzumi | |
| 2011/0295492 A1* | 12/2011 | Okuda et al. | 701/103 |
| 2012/0016563 A1* | 1/2012 | Ohsaki | 701/102 |

FOREIGN PATENT DOCUMENTS

| | | |
|---|---|---|
| EP | 1 923 560 A2 | 5/2008 |
| JP | 9-285108 A | 10/1997 |
| JP | 2001-55948 A | 2/2001 |
| JP | 2001-234793 A | 8/2001 |
| JP | 2003-106200 A | 4/2003 |
| JP | 2003-148212 A | 5/2003 |
| JP | 2005-344603 A | 12/2005 |
| JP | 2008-115848 A | 5/2008 |
| JP | 2009-22139 A | 1/2009 |

OTHER PUBLICATIONS

European Search Report Dated Aug. 5, 2011 (Three (3) pages).

* cited by examiner

PRIOR ART

PRIOR ART

INTERNAL COMBUSTION ENGINE CONTROLLER

BACKGROUND OF THE INVENTION

1. Field of the Invention

The present invention relates to an internal combustion engine controller, and more particularly to an internal combustion engine controller, such as a power source device for an in-cylinder direct injection injector of a vehicular internal combustion engine, etc., suitable for use in driving a load using a high voltage obtained by boosting the voltage of a battery power source.

2. Background Art

As an internal combustion engine that runs on gasoline, diesel or the like, there is known an internal combustion engine of an in-cylinder direct injection scheme that injects fuel directly into the cylinder at the compression stroke by means of an injector (fuel injection valve) in order to improve fuel economy. In an internal combustion engine of the in-cylinder direct injection scheme, stratified combustion can be achieved where atomized fuel is present only around the spark plug to establish combustion, and the air therearound serves as thermal insulation for the cylinder walls and to press the piston down by means of thermal expansion from the energy at the time of combustion. Thus, as compared to an internal combustion engine that combines "port injection" and a "premixed combustion scheme" in which fuel is injected at the intake stroke, heat loss can be reduced, which results in better fuel economy.

In the case of an internal combustion engine of a scheme in which in-cylinder direct injection is performed, because fuel is injected by the injector at the compression stroke, highly pressurized fuel has to be used, and high energy is required for the valve opening operation of the injector due to the increase in fuel pressure. Further, in order to improve responsiveness to control and accommodate high speed revolution, this high energy has to be supplied to the injector within a short period of time.

A conventional example of a power circuit of the in-cylinder direct injection scheme (direct injection injector) will be described with reference to FIG. 15. The power circuit comprises a boost circuit 10 that boosts a voltage Vbat of a battery power source 1 to a higher voltage Vbst, and employs a scheme wherein the current flowing through an injector 3 is raised in a short period of time by the boost voltage Vbst that the boost circuit 10 generates (for example, see JP Patent Publication (Kokai) No. 2001-55948 A and JP Patent Publication (Kokai) No. 2009-22139 A).

Injector current Ainj shown in FIG. 16 is a current waveform of a typical direct injection injector. During peak current flowing time t1 at the initial stage of current flow, the injector current Ainj rises to a predefined peak current a1 over a short period of time using the boost voltage Vbst. This peak current a1 is greater by a factor of about 5 to 20 as compared to a case of a scheme in which a mixture gas of air and fuel is drawn into the cylinder at the intake stroke.

Upon expiration of the peak current flowing time t1, the power-source voltage of the injector 3 shifts from the boost voltage Vbst to the battery power-source voltage Vbat, and the injector current Ainj drops to a hold current a2 that is about ½ to ⅓ of the peak current a1. Thereafter, the injector current Ainj further drops to a hold current a3 that is about ⅔ to ½ of the hold current a2.

The injector 3 opens its valve by means of the peak current a1 and the hold current a2, and injects fuel into the cylinder. The time it takes to shift from the peak current a1 to the hold current a2 is determined by the magnetic circuit characteristics and fuel atomizing characteristics of the injector 3, the fuel pressure of the common rail that supplies fuel to the injector 3, and the power demanded of the internal combustion engine.

In order to achieve better fuel economy, the amount of fuel injected must be controlled with precision. To this end, it is necessary that the flowing current drop time t2 for the injector current Ainj be shortened and the injector current Ainj be dropped quickly so that the closing of the valve of the injector 3 would be carried out quickly. Further, it is also necessary to drop the current within a short period of time in the process of shifting from the peak current a1 to the hold current a2 and in the process of shifting from the hold current a2 to the even smaller hold current a3.

However, high energy is stored in the injector 3 due to the fact that the injector current Ainj is flowing. In order to drop the current, this energy needs to be eliminated from the injector 3. In order to realize this within the flowing current drop time t2 of a short duration, various schemes have conventionally been employed, examples of which include a scheme in which energy is converted to thermal energy using the Zener diode effect at a drive element of a drive circuit 4 of the injector 3, a scheme in which the injector current Ainj is recirculated to a boost capacitor 13 of the boost circuit 10 via a current recirculating diode 8, and so forth.

With the scheme in which energy is converted to thermal energy, it is possible to simplify the drive circuit 4. However, because the energy of the flowing current of the injector 3 is converted to thermal energy, it is unsuitable for drive circuits of large currents. In contrast, with the scheme in which current is recirculated to the boost capacitor 13, heat generation of the drive circuit 4 can be relatively suppressed even when a large current is flowing through the injector 3. Thus, this scheme is widely employed in internal combustion engines using a direct injection injector (sometimes referred to as "common rail engines") that uses diesel which causes a large current to flow through the injector 3, and in internal combustion engines that use an in-cylinder direct injection injector that uses gasoline as fuel.

In the boost circuit 10 used for these purposes, the drive circuit 4 causes the injector current Ainj to flow through the injector 3 using the boost voltage Vbst. As a result, as shown in FIG. 16, when it is detected by a voltage detection portion 21 that the boost voltage Vbst has fallen to or below a boost start voltage b1, a boost control portion 29 starts a boost operation. Once the boost operation is started, the boost control portion 29 changes a boost control signal (c) for causing a current to flow through a boost switch element 16 from low to high. Thus, a current flows from the battery power source 1 to a boost coil 11, and energy is stored in the boost coil 11. The current that flows through the boost coil 11 is converted as a shunt resistor flowing current Ashu to a voltage by a shunt resistor element (boost switching current detection resistor element) 12, and is detected by a current detection circuit 26.

Once the shunt resistor flowing current Ashu reaches a predetermined switching stop current e1, the boost control portion 29 changes the boost control signal (c) that controls the opening/closing of the boost switch element 16 from high to low, and interrupts the shunt resistor flowing current Ashu. Thus, the current flowing through the boost coil 11 becomes unable to flow to the power source ground via the boost switch element 16, and the energy stored by the inductive component of the boost coil 11 generates a high voltage.

Further, when this voltage becomes greater than the combined voltage of the boost voltage Vbst stored in the boost capacitor 13 and the forward voltage of a charge diode 14, the energy stored in the boost coil 11 shifts as a charge current Acha to the boost capacitor 13 via the charge diode 14.

In so doing, the charge current Acha declines rapidly, along with the energy shift to the boost capacitor 13, from the switching stop current e1 that was flowing through the boost coil 11 immediately before the interruption by the boost switch element 16.

If it is detected by the voltage detection portion 21, which detects the boost voltage Vbst, that the boost voltage Vbst that rose through the operation above does not reach a predetermined boost stop voltage b2, the boost control portion 29, without detecting the charge current Acha, changes the boost control signal (c) from low to high in order to cause a current to flow through the boost switch element 16 in accordance with a predefined boost switching period (constant pulse width) t4. This operation is repeated in accordance with a boost voltage recovery time t3 that it takes for the boost voltage to reach the predetermined boost stop voltage b2.

Thus, as compared to a boost circuit that controls by means of a predefined time (a period in which the duration for changing the boost control signal (c) from low to high is made to be of a constant length) without detecting the shunt resistor flowing current Ashu, the boost circuit 10 that detects the shunt resistor flowing current Ashu and controls so that the predetermined switching stop current e1 is not exceeded is capable of keeping the shunt resistor flowing current Ashu low. As a result, it is possible to suppress heat generation from the boost switch element 16, the boost coil 11, and the charge diode 14 to a minimum.

Further, there has been proposed a power circuit that is configured in such a manner that the current upstream of the boost switch element 16 is monitored, and if this current drops to a predetermined current value, the boost control portion 29 switches the boost control signal (c) that controls the opening/closing of the boost switch element 16 from low to high (for example, see JP Patent Publication (Kokai) No. 2005-344603 A).

SUMMARY OF THE INVENTION

When employing an in-cylinder direct injection injector, a boost circuit is routinely used in the power circuit. However, as compared to a scheme in which a mixture gas of air and fuel is drawn into the cylinder at the intake stroke, the boost circuit will be handling currents that are about 5 to 20 times greater. As a result, the life of electronic components is reduced accompanied by a rise in the temperature of the circuit as a whole, noise increases, and the structure would require heat dissipation, all of which lead to an increase in costs.

Further, even with the power circuit shown in FIG. 15, although boost control is effected through the boost switching period t4, since this control is not based on the time from the point at which the boost switch element is interrupted (the current flowing through the boost coil begins to drop) up to the point at which current flow is started (the current flowing through the boost coil begins to rise), it cannot be said that the problems indicated above can be solved adequately.

In addition, with the power circuit disclosed in JP Patent Publication (Kokai) No. 2005-344603 A, a circuit for detecting the current upstream of the boost switch element 16 becomes necessary in order to detect the minimum value of the current. Further, that detection circuit and the boost control portion 29 must accommodate high voltages from the power-source voltage to the boost voltage Vbst. Thus, there arises a need to consider voltage resistance and detection accuracy.

The present invention is made in view of the above-mentioned problems to be solved, and its object is to provide an internal combustion engine controller that is capable of realizing a reduction in the maximum current value and current regulation without sacrificing boost performance and at low costs.

A further object is to provide, in order to achieve a current regulated control scheme for the boost circuit, an internal combustion engine controller including a protection circuit that ensures a stable boost operation even when a large current flows under unstable conditions such as variations in the boost switch element, current falling gradient at boost activation, etc., and that prevents element damage even in the event of overcurrent occurring.

In order to achieve the objects above, an internal combustion engine controller according to the present invention comprises: a boost coil configured to boost a voltage of a battery power source; a boost switch element configured to switch between causing a current to flow and stopping a current from flowing through the boost coil; and a current detection portion configured to detect a current flowing through the boost switch element, wherein boost control is effected by repeating the switching of the boost switch element, the voltage boosted at the boost coil is charged to a boost capacitor via a diode, and during the boost control, the internal combustion engine controller makes the boost switch element stop the current flowing through the boost coil when the detected current reaches a switching stop current value and, after a predetermined set time has elapsed from the point at which current flow is stopped, makes the boost switch element cause a current to flow through the boost coil.

According to the present invention, by causing a current to flow through the boost switch element from the battery power source, a switching current is caused to flow through the boost coil, and by detecting that the switching current has reached a predefined switching stop current value, current flow through the boost switch element is stopped. It is thus possible to repeatedly execute a sequence of boost operations such as charging a high voltage, which is generated at the boost coil when the switching current is dropped, to the boost capacitor via a charge diode.

Further, by means of time control which defines an elapsed time (current falling time) from the point at which current flow is stopped during boost control, it is possible to control the amount by which the current flowing through the boost coil drops, and to repeatedly execute a boost operation within a predefined current value range without dropping to, for example, zero amperes.

In addition, by managing the minimum value of the current flowing through the boost circuit by time, unlike a current detection scheme that requires a current detection circuit for a high voltage portion from the power-source voltage to the boost voltage, boost control can be achieved at low costs without requiring the addition of a minimum value detection circuit for the current flowing through such a high voltage portion upstream of the boost coil.

It is preferable that an internal combustion engine controller according to the present invention comprise a selector switch configured to change the switching stop current value.

Further, it is preferable that an internal combustion engine controller according to the present invention comprise a set time changing portion configured to change the set time, and that the set time changing portion comprise: a first time setting portion configured to set the set time to a first set time from the point at which current flow is stopped, the first set time being a time in which the current flowing through the boost coil does not drop to zero amperes (i.e., it is made to drop in such a manner that it remains within the bounds of a predetermined target current value); a second time setting portion configured to set the set time to a second set time from the point at which current flow is stopped, the second set time being a time in which the current flowing through the boost coil drops to zero amperes; and a time switching portion configured to switch between the first set time and the second set time.

In another embodiment, it is preferable that an internal combustion engine controller according to the present invention be such that the set time changing portion changes the set time based on a low-frequency clock signal or a high-frequency clock signal. This makes it possible to variably set the drive frequency of the boost switch element.

Further, it is preferable that an internal combustion engine controller according to the present invention comprise a voltage detection portion configured to detect the voltage boosted at the boost coil, that the boost control be started when the detected voltage drops to reach a predetermined boost start voltage, and that the boost control be terminated when the detected voltage rises to reach a predetermined boost stop voltage. It is preferable that an internal combustion engine controller according to the present invention comprise a voltage selector switch configured to change the value of the boost stop voltage.

Thus, according to the present invention, by not allowing the minimum value of the current flowing through the boost circuit drop to 0 A, it is possible to keep the difference between the maximum value and the minimum value of the current flowing through boost circuit to a minimum, and to keep the current value fluctuation per unit time for the current flowing through the boost circuit to a minimum. In this case, in order to leave some degree of freedom, the specification of the boost control circuit is such that the switching frequency and the on-time of the boost switch element are variable, the boost voltage value and the current waveform can be set as desired, and the setting thereof can be performed from outside of the boost control circuit.

In an internal combustion engine controller according to the present invention, it is preferable that a plurality of the boost switch elements be connected in parallel. This makes it possible to divide the current among the boost switch elements.

It is preferable that an internal combustion engine controller according to the present invention comprise a limiting protection circuit configured to limit the current flowing through the boost coil by switching the boost switch element based on the detected current, and that the protection circuit comprise an overcurrent detection circuit configured to detect whether or not the current flowing through the boost coil is excessive based on the detected current, and control the switching of the boost switch element based on a detection result of the overcurrent detection circuit. Further, it is preferable that, when the overcurrent detection circuit detects overcurrent, the time switching portion switch the set time from the first set time to the second set time.

In addition, it is preferable that an internal combustion engine controller according to the present invention comprise: a detection circuit configured to detect whether or not the detected current has reached the switching stop current value; a switching determination circuit configured to determine whether or not to switch the set time based on an output signal of the detection circuit and an output signal of the overcurrent detection circuit; and a wait time generation circuit configured to input the output signal from the detection circuit to the switching determination circuit after delaying an input timing of the output signal from the detection circuit by a predetermined length of time, wherein the time switching portion performs the switching of the set time based on a determination result of the switching determination circuit.

By further adding an overcurrent detection protection circuit to a conventionally known current detection circuit, an internal combustion engine controller according to the present invention is able to, in the event of a large current occurring under such unstable conditions as variations in the boost switch elements, etc., switch an off-time of a drive signal of the boost switch element to reduce the current flowing through the boost switch element.

In addition, an internal combustion engine controller according to the present invention may comprise a diagnostic portion configured to output a signal indicating an anomaly in the internal combustion engine controller if the overcurrent is detected.

It is also preferable that an internal combustion engine controller according to the present invention further comprise: a drive signal generation circuit configured to generate a pulsed output signal for performing the switching of the boost switch element; and a switch element for suppressing heat generation provided between the boost switch element and the drive signal generation circuit. According to the invention, by inserting the switch element upstream of the boost switch element, it is possible to suppress heat generation by the boost switch element.

Further, it is preferable that an internal combustion engine controller according to the present invention comprise a switching circuit configured to switch the output signal of the drive signal generation circuit to an inverted state or a non-inverted state, and that it pull up or pull down the output signal of the drive signal generation circuit at the time of the switching of the output signal.

According to an internal combustion engine controller of the present invention, by reducing the maximum value of the drive current, it is possible to reduce heat generation of the boost circuit from what is conventional. Further, by reducing the amount of current value fluctuation per unit time, it is possible to suppress the frequency with which noise occurs. By managing the minimum value of the current flowing through the boost circuit by time, unlike a current detection scheme that requires a current detection circuit for the high voltage portion from the power-source voltage to the boost voltage, the addition of such a detection circuit for the minimum value of the current flowing through the high voltage portion upstream of the boost coil is not necessary.

DETAILED DESCRIPTION OF THE PREFERRED EMBODIMENTS

Embodiments of an internal combustion engine controller (a boost power source device) according to the present invention will be described with reference to the drawings.

Embodiment 1

Figure 1:
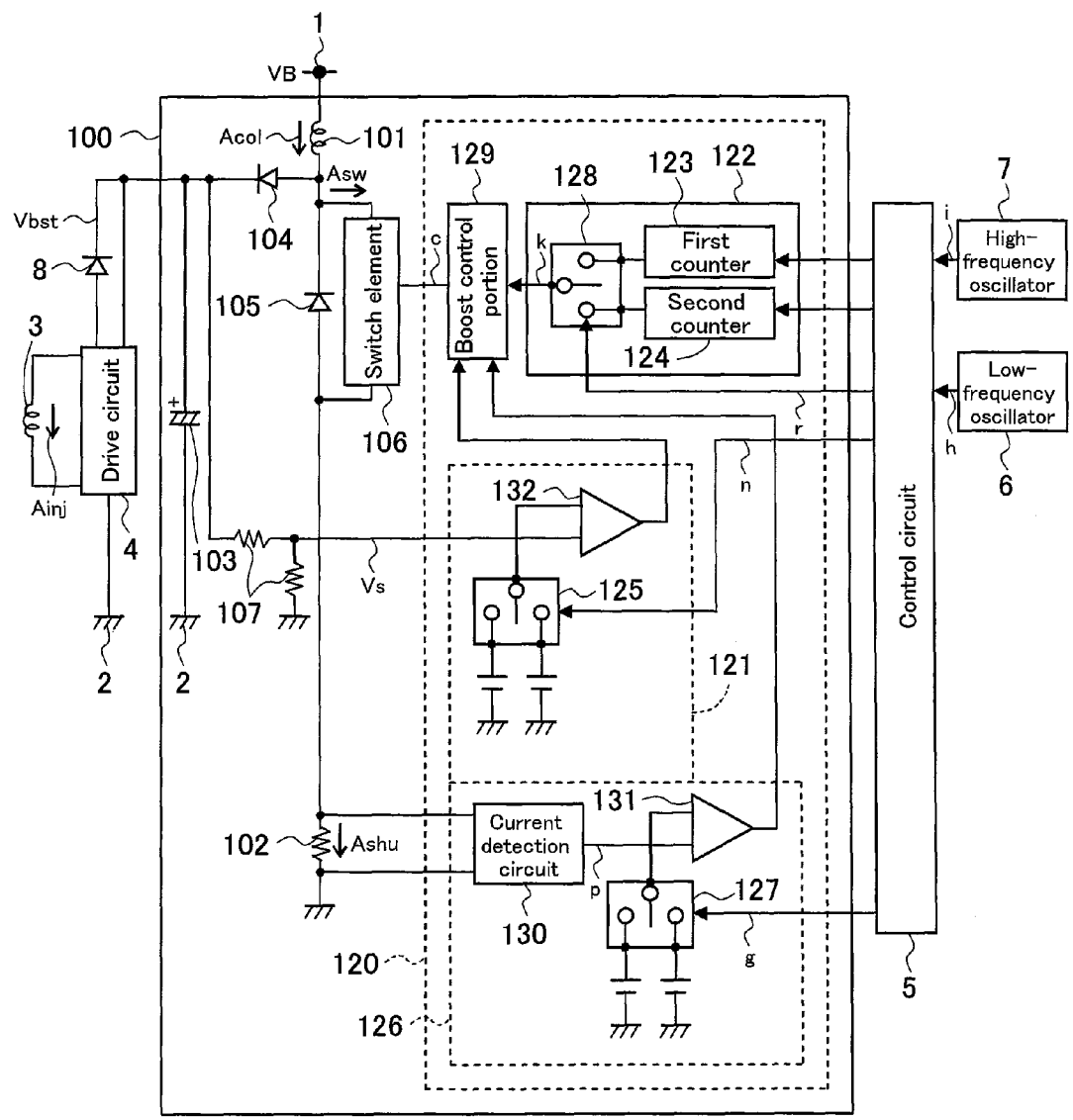
FIG. 1 is a block diagram collectively showing Embodiments 1 to 4 of an internal combustion engine controller (a boost power source device) according to the present invention.
Figure 2:
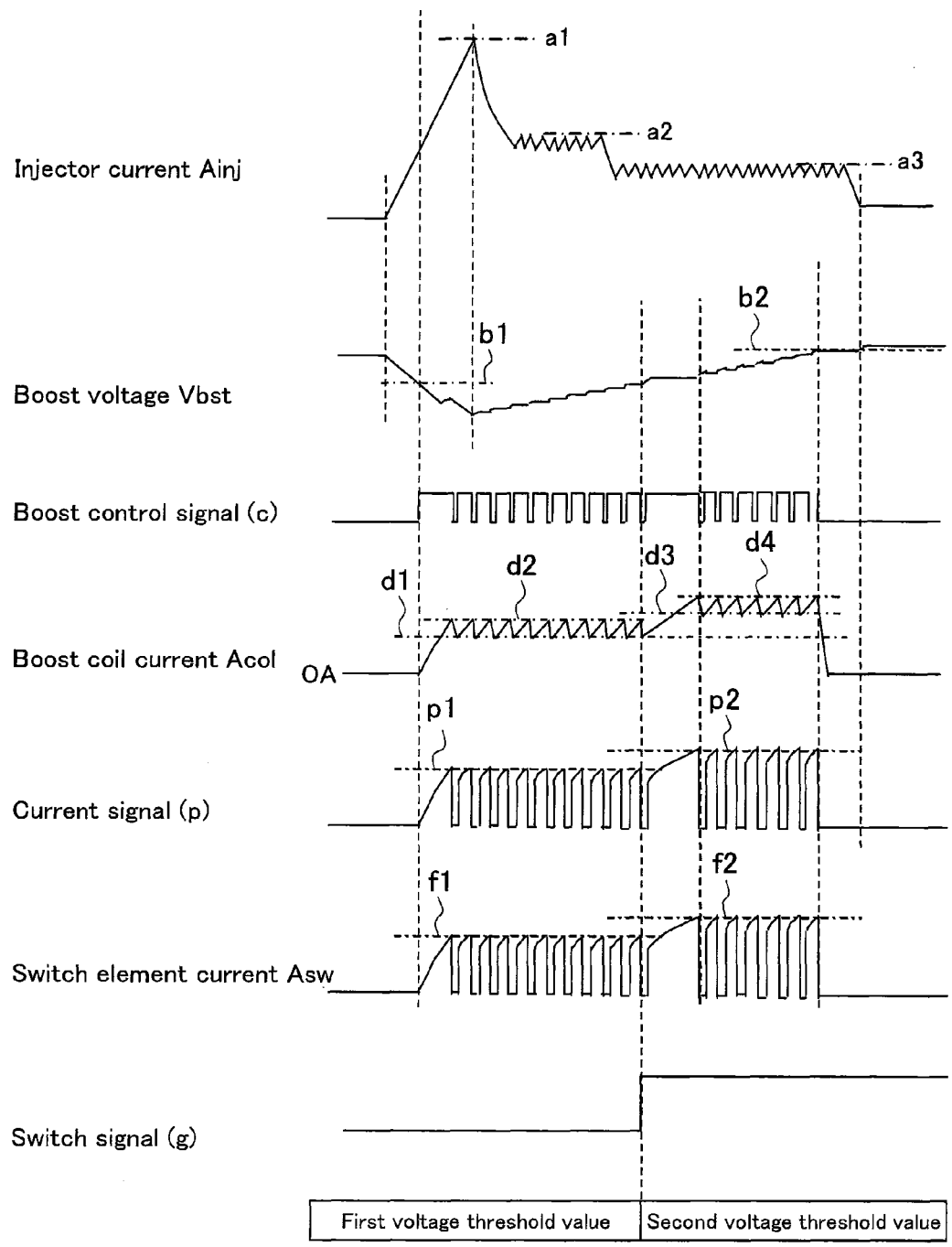
FIG. 2 is a time chart showing the operation of a boost power source device according to Embodiment 1.
Figure 3:
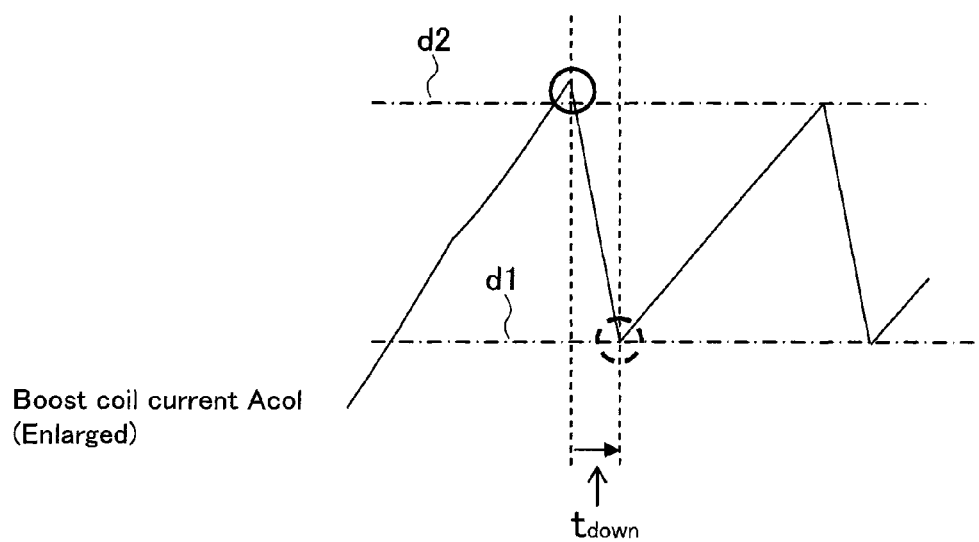
FIG. 3 is a partially enlarged view of the waveform of the boost coil current shown in FIG. 1.

Embodiment 1, which employs an internal combustion engine controller (a boost power source device) according to the present invention as a constant-current boost scheme power circuit for an injector, is described using FIG. 1, FIG. 2 and FIG. 3.

As shown in FIG. 1, a boost power source device according to the present embodiment comprises a boost circuit 100 to which power is supplied by means of a battery power source 1 and a power source ground 2 thereof. A drive circuit 4 of an injector 3 drives the injector 3 using a boost voltage Vbst that is boosted to a high voltage by the boost circuit 100.

The boost circuit 100 comprises a boost coil 101 that has an inductive component for boosting a voltage VB of the battery power source 1. Current flow is caused/interrupted with respect to the boost coil 101 by means of a boost switch element 106 that is turned on or off by a boost control signal (c). In other words, the boost switch element 106 performs switching between causing and stopping current flow through the boost coil 101. In order to protect the boost switch element 106 from a negative surge, a parasitic diode 105 is present in parallel with the boost switch element 106.

The boost circuit 100 comprises: a shunt resistor element 102 configured to detect a current that flows from the boost coil 101 to the boost switch element 106 (a shunt resistor flowing current Ashu); a circuit configured to charge to a boost capacitor 103 a high voltage generated by energy that is stored in the boost coil 101 by interrupting the boost switch element 106; and a charge diode 104 configured to prevent current from flowing in reverse from the boost capacitor 103 to the battery power source 1.

Further, the boost circuit 100 comprises a boost control circuit 120. The boost control circuit 120 comprises a boost control portion 129, a boost control timing generation portion (set time changing portion) 122, a voltage detection portion (voltage detection portion) 121, and a current monitor circuit (current detection portion) 126.

Here, the voltage detection portion (voltage detection portion) 121 detects a voltage Vs which is divided, via voltage-dividing resistors 107, from the voltage Vbst boosted at the boost coil 101. Further, the current monitor circuit (current detection portion) 126 detects the current flowing through the boost switch element 106 and, specifically, detects the current flowing through the shunt resistor element 102.

A control circuit 5 takes a boost basic clock generated by a low-frequency oscillator 6 and a high-frequency clock signal generated by a high-frequency oscillator 7 as input, and outputs a signal to the boost control timing generation portion (boost timing control circuit) 122.

In a normal boost operation, the drive circuit 4 causes an injector current Ainj to flow through the injector 3 by applying the boost voltage Vbst. If the voltage detection portion 121 detects that the boost voltage Vbst has dropped to or below a boost start voltage b1, the boost control portion 129 begins the boost operation (boost control). After the boost operation has begun, the boost control portion 129 changes the boost control signal (c), which is for causing a current to flow through the boost switch element 106, from low to high. A current thus flows through the boost coil 101 from the battery power source 1, and energy is stored in the boost coil 101.

The current flowing through the boost coil 101 flows through the shunt resistor element 102. This current is converted into a voltage by the current monitor circuit 126 and is inputted to a comparator 131 as a current signal (p) based on the voltage value. The comparator 131 compares a reference voltage (a switching stop current value) and the current signal (p), outputs a high signal to the boost control portion 129 if the current signal (p) is less than the reference voltage, and outputs a low signal to the boost control portion 129 if the current signal (p) is equal to or greater than the reference voltage (if the detected current has reached the switching stop current value). The boost control portion 129 thus makes the boost switch element 106 stop the flow of current through the boost coil.

The reference voltage of the comparator 131 may have its voltage level changed by a threshold value selector switch 127. It is thus possible to change the value of the switching stop current.

Specifically, as shown in FIG. 2, when the reference voltage of the comparator 131 is switched from a first voltage threshold value to a second voltage threshold value (that is, when the switching stop current value (current threshold value) is switched), the maximum value of the current signal (p) changes from a first current signal maximum value p1 to a second current signal maximum value p2.

Along therewith, the maximum value of a boost coil current Aco1 also changes, and by switching the threshold value selector switch 127, a boost coil current maximum value d2 at the first voltage threshold value changes to a boost coil current maximum value d4 at the second voltage threshold value. Since the amplitude of the boost coil current Aco1 is held constant upon boosting, a boost coil current minimum value d1 at the first voltage threshold value similarly shifts upward to a boost coil current minimum value d3 at the second voltage threshold value. Further, the maximum value of a current Asw of the boost switch element 106 similarly changes from f1 to f2.

The switching of the voltage threshold value by the threshold value selector switch 127 may be performed by means of an external signal by inputting a switch signal (g) from the control circuit 5.

With respect to boost control, there are cases where the falling of the boost coil current Aco1 is managed by time and cases where it is managed by current.

In the case of management by time, as shown in FIG. 3, after the boost coil current Aco1 has reached the boost coil current maximum value (after the switch element current Asw (detected current) has reached a predetermined value), the boost control portion 129 switches the boost control signal (c) from high to low. As a result, the boost switch element 106 is placed in an off-state (a state in which current flow is stopped), and the boost coil current Aco1 begins to drop. At this point, an elapse time from the point (timing) at which current flow is stopped is set (set time Tdown is set). This set time Tdown is a period of time that is preset according to the falling characteristics of the boost coil current Aco1 after current flow is stopped. These current characteristics at falling are changes in current fall over time, and represent the time it takes to fall to a predetermined target current value after current flow is stopped, and may be defined in advance through experimentation, analysis, etc. Further, the preset time (a predetermined set time) Tdown is counted by a first counter 123 of the boost control timing generation portion 122 from the point at which current flow is stopped, and once this predetermined set time Tdown has elapsed, the boost control signal (c) is switched again from low to high and the boost switch element 106 is turned on (the boost switch element is made to cause a current to flow through the boost coil), thus effecting management by time. Under such management by time, by effecting boost control in which the boost switch element 106 is made to repeat switching between causing and stopping a current to flow through the boost coil 101 by means of the boost control signal (c) outputted from the boost control portion 129, it becomes possible to repeatedly execute the boost operation continuously. This drop time (set time) is variable, and it is possible to vary the time within a range in which the boost coil current minimum value d1 or d3 would not drop to 0 A.

Thus, it is possible to suppress the difference between the maximum and minimum values of the current flowing through the boost circuit 100 to a minimum, and to suppress the current value fluctuation per unit time of the current flowing through the boost circuit 100 to a minimum.

In addition, by setting the time Tdown from the point at which current flow is stopped during boost control and thereby managing the minimum value of the current flowing through the boost circuit (i.e., the falling of the boost coil current Aco1) by the set time Tdown, it is possible to control the boost coil current Aco1 flowing through the boost coil 101. Further, unlike a current detection scheme that requires a current detection circuit for the high-voltage portion from the power-source voltage to the boost voltage, there is no need to add a detection circuit for detecting the minimum value of the current flowing upstream of the boost switch element 106.

In the case of management by current, if, by monitoring the boost coil current Aco1 upstream of the boost switch element 106 using the same method as the method for monitoring the current value of the boost coil current Aco1, it is detected that the boost coil current Aco1 has dropped to the preset boost coil current minimum value d1 or d3, the boost control signal (c) is again switched from low to high and the boost switch element 106 is turned on. Thus, in this case, too, it becomes possible to effect boost control in which the boost operation is repeatedly executed continuously.

Embodiment 2

Figure 4:
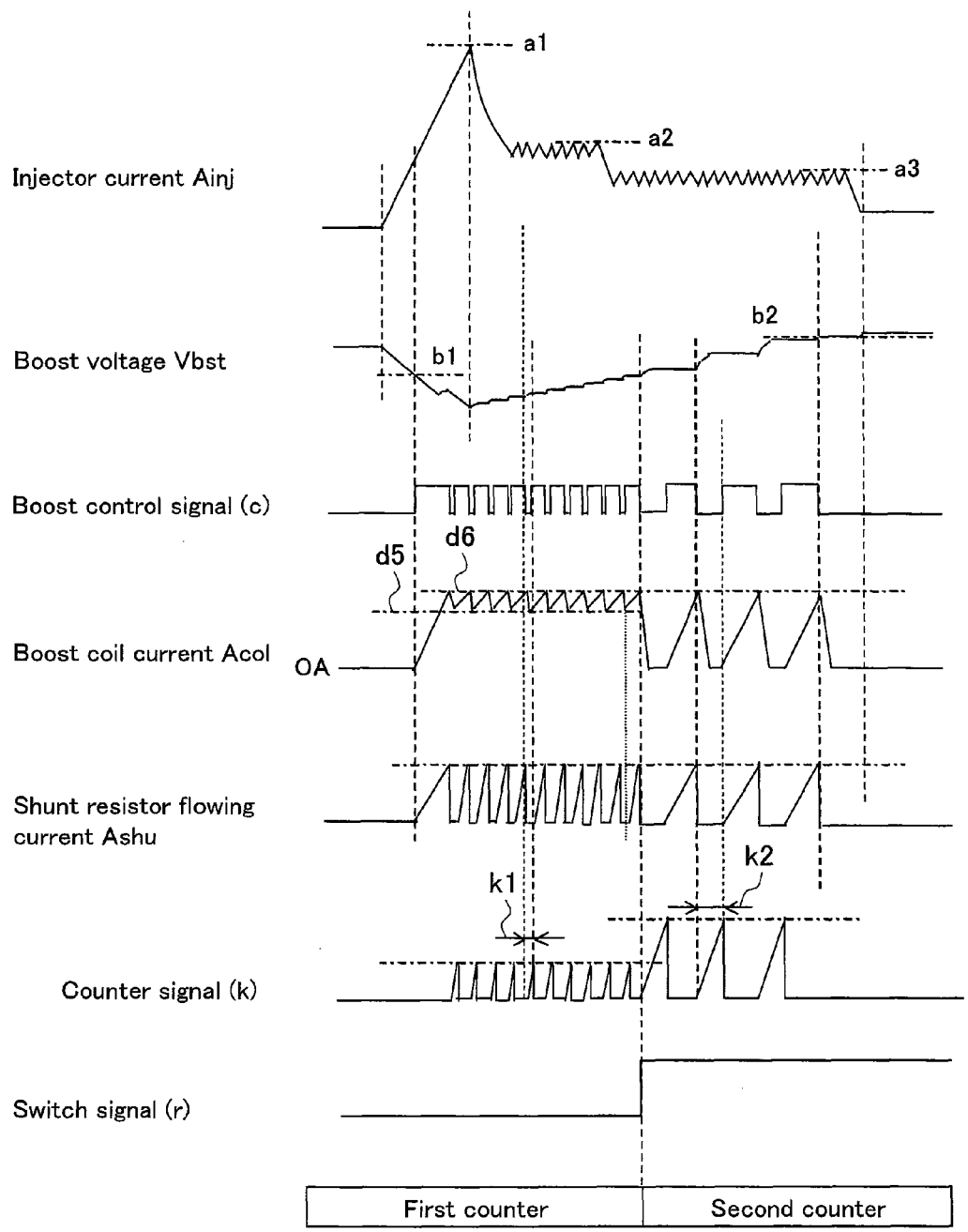
FIG. 4 is a time chart showing the operation of a boost power source device according to Embodiment 2.

In Embodiment 2, as shown in FIG. 4, there is presented a case in which, in effecting boost control in which boost drive is repeatedly executed by the boost control timing generation portion (set time changing portion) 122, the boost power source device switches between a mode in which a boost coil current minimum value d5 is not allowed to drop to 0 A (i.e., it is dropped so as to remain within the bounds of a predetermined target current) (the mode shown in Embodiment 1), and a mode in which it is dropped to 0 A.

In Embodiment 2, as shown in FIG. 4, the boost control timing generation portion 122 comprises: the first counter (first time setting portion) 123 that takes an off-time k1, which does not allow the boost coil current minimum value d5 to drop to 0 A, to be the set time Tdown in Embodiment 1 (see FIG. 3) and counts this as a first set time; and a second counter (second time setting portion) 124 that takes an off-time k2, during which the boost coil current minimum value d5 is dropped to 0 A, to be the set time Tdown in Embodiment 1 and counts this as a second set time. Further, there is provided a counter selector switch (time switching portion) 128 that switches between the first set time and the second set time by selectively switching between these counters.

In this case, by inputting a switch signal (r) from the control circuit 5 in order to switch the counter selector switch 128, it is possible to perform mode switching via an external signal.

When the counter selector switch 128 is connected to the first counter 123 and the boost operation is begun, the boost switch element 106 repeats the boost operation in accordance with the off-time (first set time) k1 and effects boost control. In this case, the counter (time) would be set in such a manner that the boost coil current minimum value d5 would not drop to 0 A.

In contrast, when the counter selector switch 128 is connected to the second counter 124, the boost switch element 106 repeats the boost operation in accordance with the off-time (second set time) k2, which is longer than the off-time k1, and effects boost control. In this case, because the off-time k2 is set to be longer than the off-time k1, the minimum value of the boost coil current Aco1 drops to 0 A.

Unless the threshold value selector switch 127 is switched, a maximum value d6 of the boost coil current Aco1 does not change regardless of which counter the counter selector switch 128 is connected to. Therefore, even when switching takes place from the first counter 123 to the second counter 124, there is no change in the maximum value d6 of the boost coil current Aco1.

Thus, it is possible to change the current flowing through the boost coil 101 as desired by means of the counter selector switch 128 between constant current drive, in which it does not drop to 0 A and the current fluctuation amount during boost is small, and triangular wave drive, in which the boost coil current minimum value drops to 0 A.

Further, by managing the minimum value of the current flowing through the boost circuit (i.e., the falling of the boost coil current Aco1) by switching between the first set time k1 and the second set time k2, it is possible to control the amount by which the boost coil current Aco1 flowing through the boost coil 101 drops. In addition, although in the present embodiment two set times, namely the first set time k1 and the second set time k2, were defined and switched between, more set times may also be set depending on the heat generation state of the circuit, etc., and these set times may be made continuously variable.

Embodiment 3

In Embodiment 3, there is presented a case in which the boost circuit 100 of the boost power source device drops the boost coil current Aco1 to 0 A, and repeats a boost operation in variable periods using clock signals of the low-frequency oscillator 6 and the high-frequency oscillator 7 shown in FIG. 1.

Figure 5:
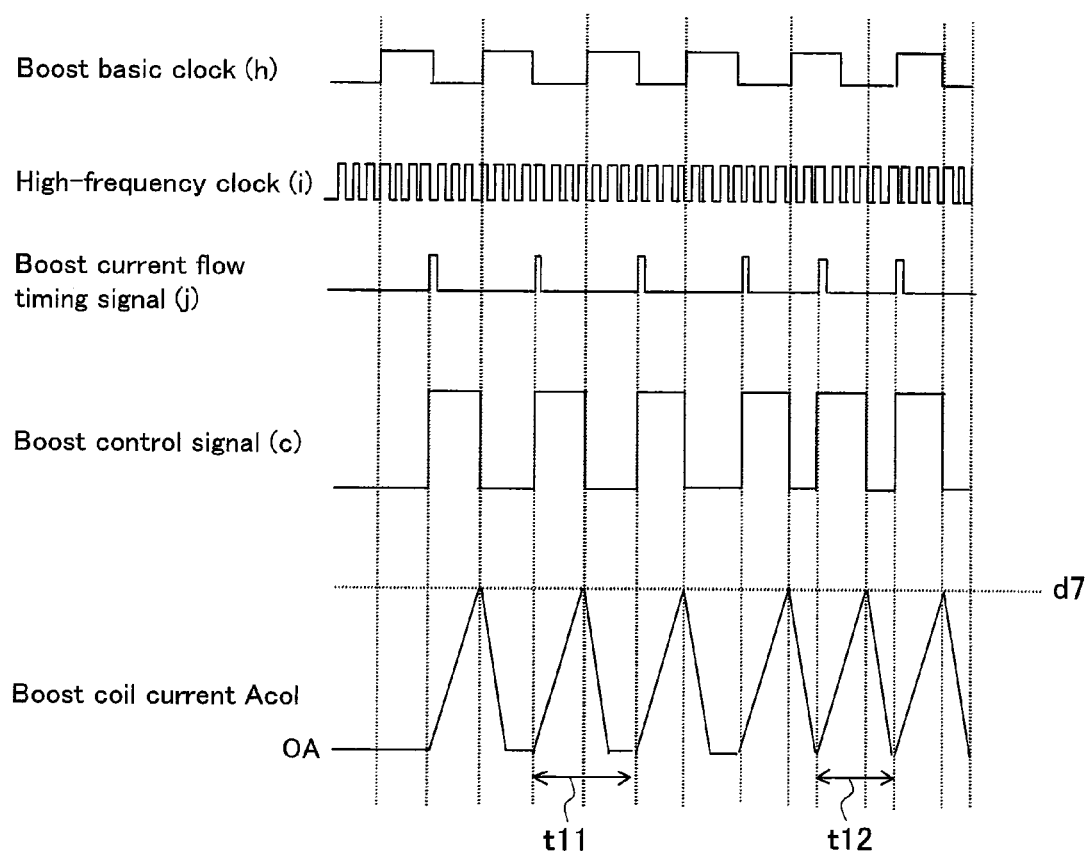
FIG. 5 is a time chart showing the operation of a boost power source device according to Embodiment 3.

Specifically, as shown in FIG. 5, a boost basic clock (low-frequency clock) (h) generated by the low-frequency oscillator 6 is taken to be one period for driving the boost switch element 106. If, after the current flow through the boost coil 101 has been started, it is detected by a current detection circuit 130 that the boost coil current Aco1 has reached a preset current value d7, the boost control signal (c) is switched from high to low, and the boost switch element 106 is placed in an off state. Thereafter, the boost coil current Aco1 is held at 0 A, and the boost control signal (c) is again switched from low to high once one cycle of the boost basic clock (h) has elapsed, and the boost switch element 106 is placed in an on state (conductive state). It is the same drive scheme as those above in that the desired boost voltage is obtained by repeating such a series of operations.

In contrast, instead of using the boost basic clock (h), it is possible to repeatedly perform the boost operation by generating a boost current flow timing signal (j) from a high-frequency clock (i) generated by the high-frequency oscillator 7, and controlling the maximum value of the current Aco1 of the boost coil 101 through the above-mentioned current detection.

Thus, by means of the low-frequency oscillator 6 and the high-frequency oscillator 7 (set time changing portion), the predetermined time from the point at which current flow is stopped up to the point at which current is caused to flow through the boost coil can be made variable based on the signal of the low-frequency clock (boost basic clock) (h) or the signal of the high-frequency clock (i).

Further, the frequency of the high-frequency clock (i) is N times greater (where N is an integer including 1) than the frequency of the boost basic clock (h). By generating the boost current flow timing signal (j) by means of output signals of these frequencies, it is possible to variably set the drive frequency of the boost switch element 106.

In this case, under the drive by the boost basic clock (h), a boost drive period t11 matches the boost basic clock (h). On the other hand, when the boost switch element 106 is driven using the boost current flow timing signal (j) by the high-frequency clock (i), a boost drive period t12 may be altered as desired with the N times finer resolution of the high-frequency clock (i).

Embodiment 4

The boost circuit 100 of a boost power source device according to Embodiment 4 variably sets the boost voltage. In Embodiment 4, as shown in FIG. 1, the boost voltage Vbst is divided by the voltage-dividing resistors 107, and a comparator 132 of the voltage detection portion 121 compares the detected voltage Vs obtained through this division with a reference voltage.

If the detected voltage Vs is higher than the reference voltage (the boost stop voltage (the voltage threshold value m2 or m4 shown in FIG. 6)), the boost control portion 129 is instructed to stop the boost operation, and the boost control portion 129 stops the boost operation by the switch element 106.

Once the valve of the injector 3 is thereafter opened, the boost voltage Vbst begins to drop. If, due to this drop in the boost voltage Vbst, the voltage detection portion 121 then detects through the detected voltage Vs that the boost voltage Vbst has reached the boost start voltage b1 (specifically, if the detected voltage Vs has dropped to reach a boost start voltage m1), based on this detection result, the boost control portion 129 effects boost control by repeatedly causing/stopping current flow through the boost coil 101 by means of repeated switching control of the switch element 106 as discussed above, and resumes the boost operation. By repeating a series of such operations of stopping and starting the boost operation, an effect of keeping the boost voltage Vbst is achieved.

Figure 6:
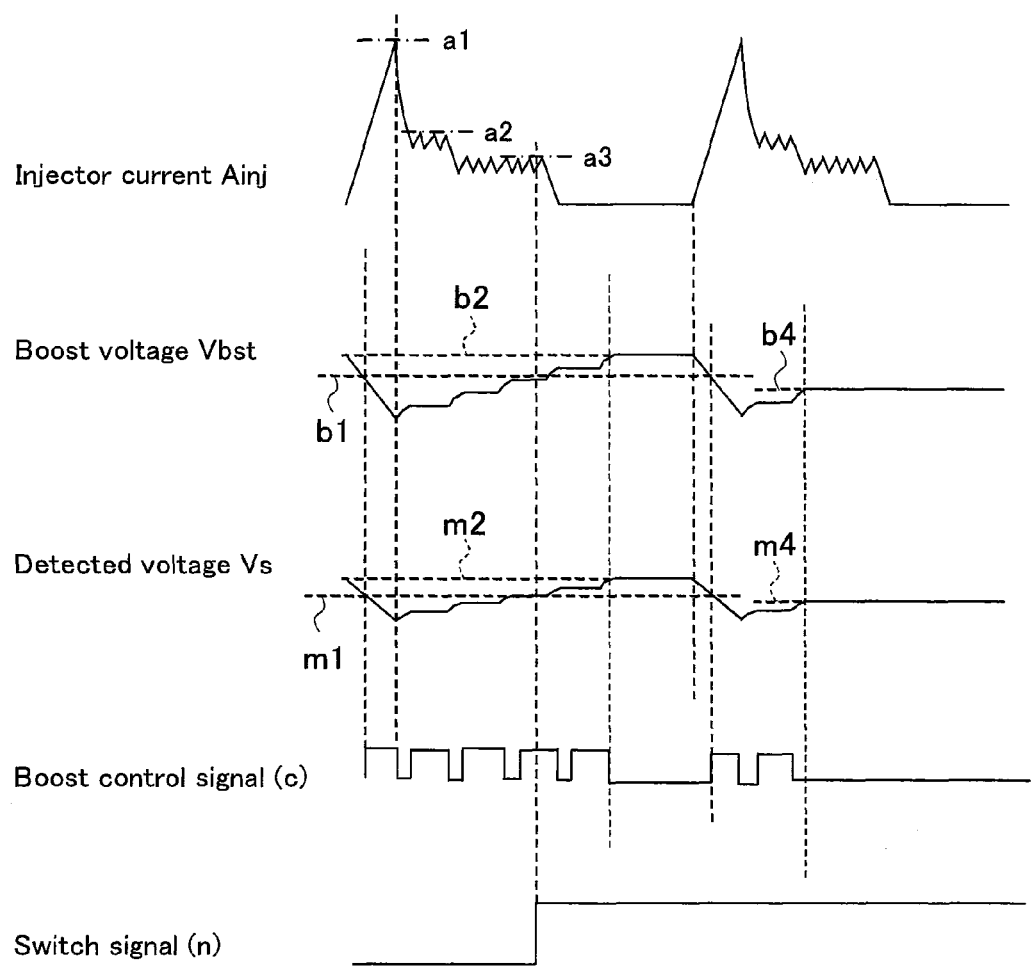
FIG. 6 is a time chart showing the operation of a boost power source device according to Embodiment 4.

Further, as shown in FIG. 6, if the threshold value of the boost stop voltage is set to the third threshold voltage (stop voltage) m2 using a threshold voltage selector switch 125, the boost control portion 129 makes the boost switch element 106 repeatedly cause/stop current flow through the boost coil 101 so as to bring (boost) the boost voltage Vbst, which has dropped due to the opening of the valve of the injector 3, back to the boost stop voltage b2.

If the threshold value of the boost stop voltage is switched to the fourth voltage threshold value m4 using the threshold voltage selector switch 125 while this boost operation is under execution, the boost voltage Vbst will recover (be boosted) to the boost stop voltage b2 once, but the threshold value will switch to the fourth voltage threshold value m4 at the time of the next voltage drop. Thus, with respect to the boost voltage Vbst, the threshold value is switched to the fourth voltage threshold value m4 at the time of the second boost voltage drop, and the boost voltage Vbst accordingly recovers (is boosted) to the boost stop voltage b4.

Thus, in the present embodiment, making the boost voltage Vbst variable is made possible by switching the reference voltage of the comparator 132 of the voltage detection portion 121 by means of the threshold voltage selector switch 125. This switching of the threshold voltage selector switch 125 is performed externally by having the control circuit 5 output a switch signal n.

Embodiment 5

Figure 7:
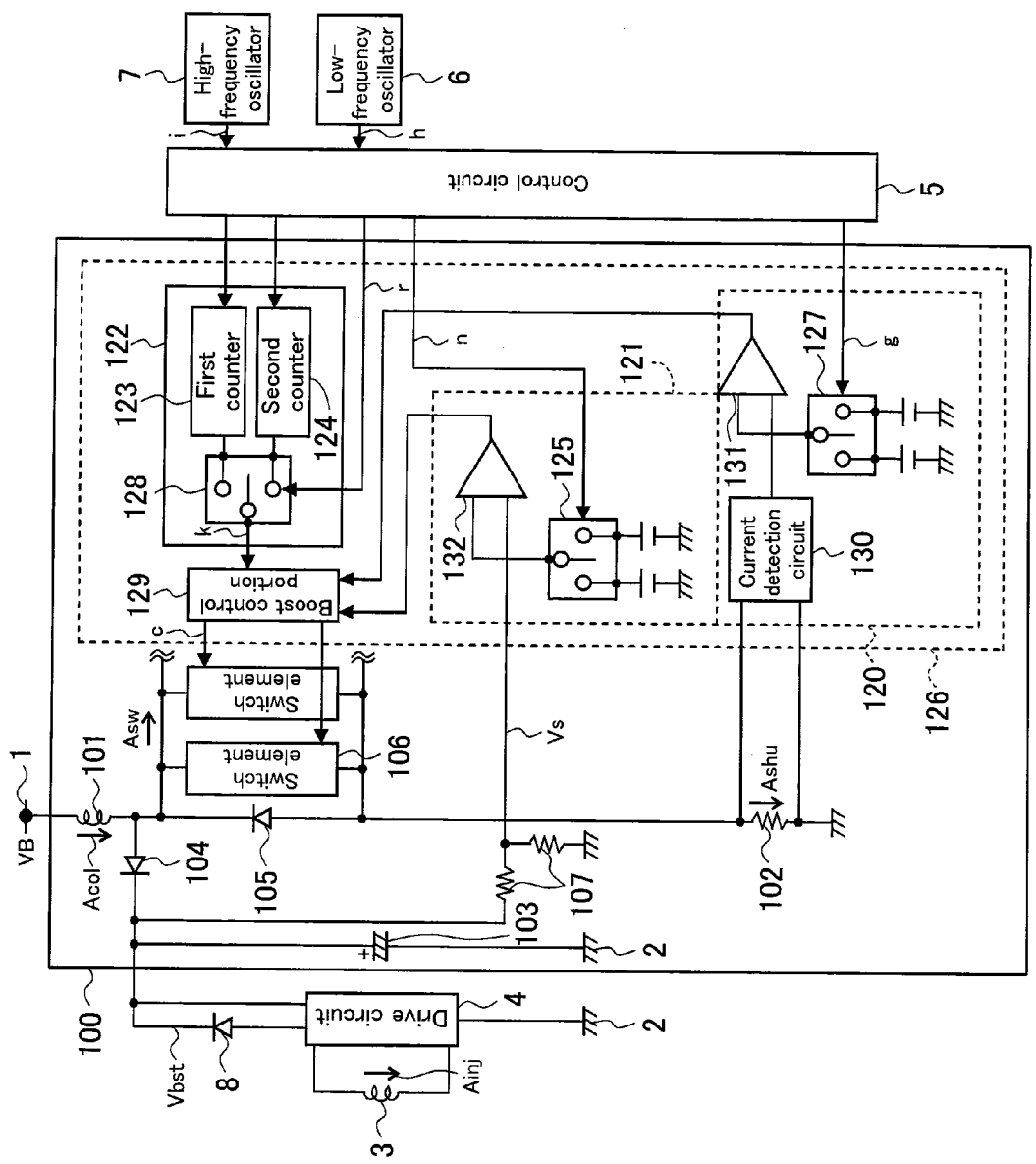
FIG. 7 is a block diagram showing Embodiment 5 of an internal combustion engine controller (a boost power source device) according to the present invention.

By connecting a plurality of the boost switch elements 106 in parallel as shown in FIG. 7, the boost circuit 100 of a boost power source device according to Embodiment 5 reduces the current flow per boost switch element and suppresses heat generation. It is noted that the embodiment shown in FIG. 7 is identical with the embodiment in FIG. 1 except for the fact that a plurality of the boost switch elements 106 are connected in parallel.

In this embodiment, the configuration is such that the plurality of boost switch elements 106 connected in parallel are driven at once by the boost control portion 129. When a current flows through the boost switch element 106, the current flows into the power source ground via the boost switch element 106 from upstream of the boost switch element 106. In this respect, by introducing a plurality of the boost switch elements 106, the current flow is divided in accordance with the number of the boost switch elements 106.

Figure 8:
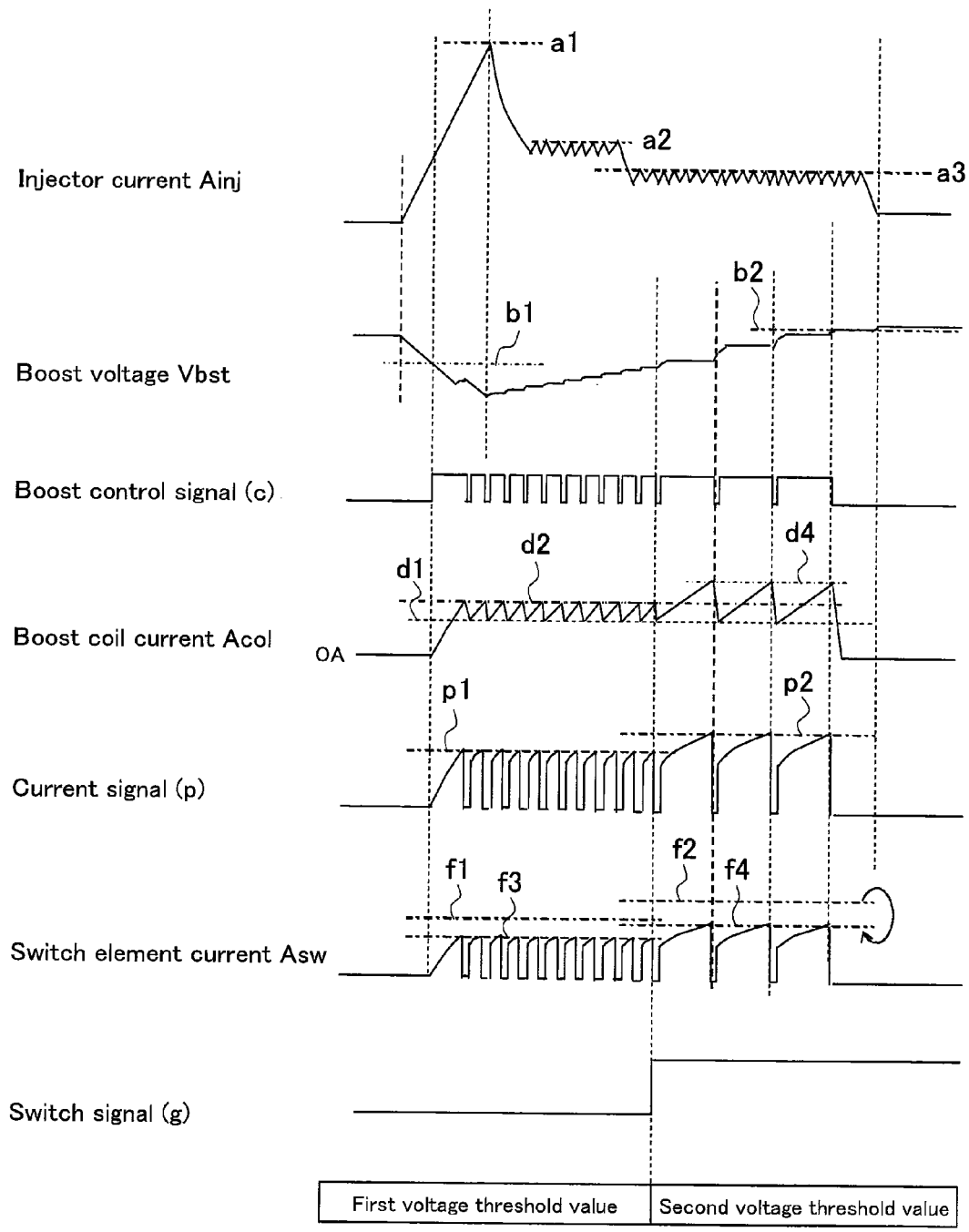
FIG. 8 is a time chart showing the operation of a boost power source device according to Embodiment 5.

Consequently, and as shown in FIG. 8, a maximum value f3 of the switch element current Asw flowing through the plurality of boost switch elements 106 becomes lower as compared with a maximum value f1 of the switch element current Asw that would flow in a case where one boost switch element is used. Similarly, even if the maximum value of the boost coil current Aco1 were changed from d2 to d4, since the current is divided in accordance with the number thereof, the maximum value of the switch element current Asw would drop from f2 to f4.

Thus, by introducing the plurality of boost switch elements 106, the current flow per boost switch element is reduced, and heat generation by the boost switch elements 106 can be suppressed.

Embodiment 6

Figure 9:
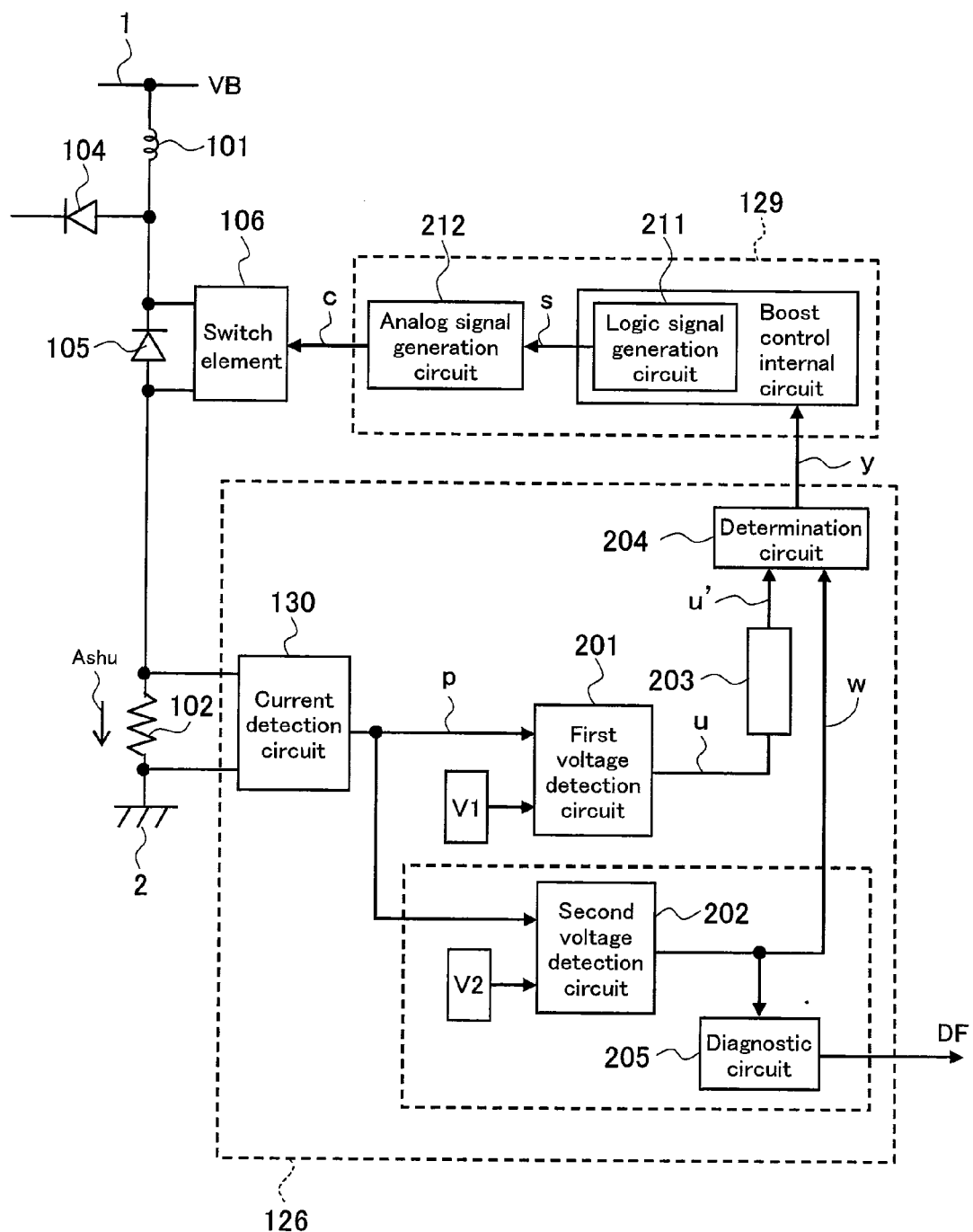
FIG. 9 is a block diagram showing Embodiment 6 of an internal combustion engine controller (a boost power source device) according to the present invention.

The main portion of a boost power source device according to Embodiment 6 will be described with reference to FIG. 9. A protection circuit for detecting overcurrent is added to the current monitor circuit 126 in the boost circuit 100 of the present embodiment. The configuration is otherwise the same as that of the embodiment shown in FIG. 1.

Ordinarily, when the boost switch element 106 is turned on by the boost control signal (c) generated at the boost control portion 129, the boost coil 101 is boosted, the current Ashu flows through the shunt resistor element 102 for detecting a current, and that current is detected by the current detection circuit 130.

The detected current value (voltage) is converted by the current detection circuit 130 into a detected voltage value (p) in accordance with the detected current value. If this converted detected voltage value (p) has reached a first reference voltage V1 (a voltage corresponding to the switching stop current value), a first voltage detection circuit 201 detects the fact that a voltage corresponding to the switching stop current value has been reached, and a first voltage detection signal (u) as an output signal of this detection result is outputted. This first voltage detection signal (u) is sent to the boost control portion 129 via a wait time generation circuit 203 and a determination circuit (switching determination circuit) 204.

The boost control portion 129 turns the boost control signal (c) off each time it receives the first voltage detection signal (u). As in Embodiment 2, the off-time k1 for the boost control signal (c) is time counted by an internal counter of the boost control timing generation portion 122.

Here, the operation of a boost power source device according to the present embodiment will be described using the timing chart shown in FIG. 10. In attempting to realize a constant-current control scheme as in the present device, that is, in order to maintain the current Ashu flowing through the shunt resistor element 102 at a constant value, it is necessary to shorten the off-time k1 for the boost control signal (c).

However, in an actual circuit, characteristics vary due to the on resistance of the boost coil 101 and the boost switch element 106, variations thereof, etc., as a result of which there may arise delays between the point at which the boost control signal (c) is generated at the boost control portion 129 and the point at which the boost switch element 106 is turned on, or, due to variations in drive performance, there may arise a state in which the boost control signal (c) does not turn off completely.

When the voltage indicated by the current signal (p), which is an output of the current detection circuit 130, is higher than the first reference voltage V1, because the first voltage detection signal (u) outputted by the first voltage detection circuit 201 is switched to high, a logic signal (s) within the boost control portion 129 switches to low. However, because the off-time for the boost control signal (c) is short, the current Ashu flowing through the shunt resistor element 102 does not drop completely. As a result, a large current would ultimately flow through the shunt resistor element 102. If a large current were to thus keep flowing, there is a possibility that it may lead to heat generation or damage in the boost switch element 106, the boost coil 101 and the shunt resistor element 102.

Figure 11:
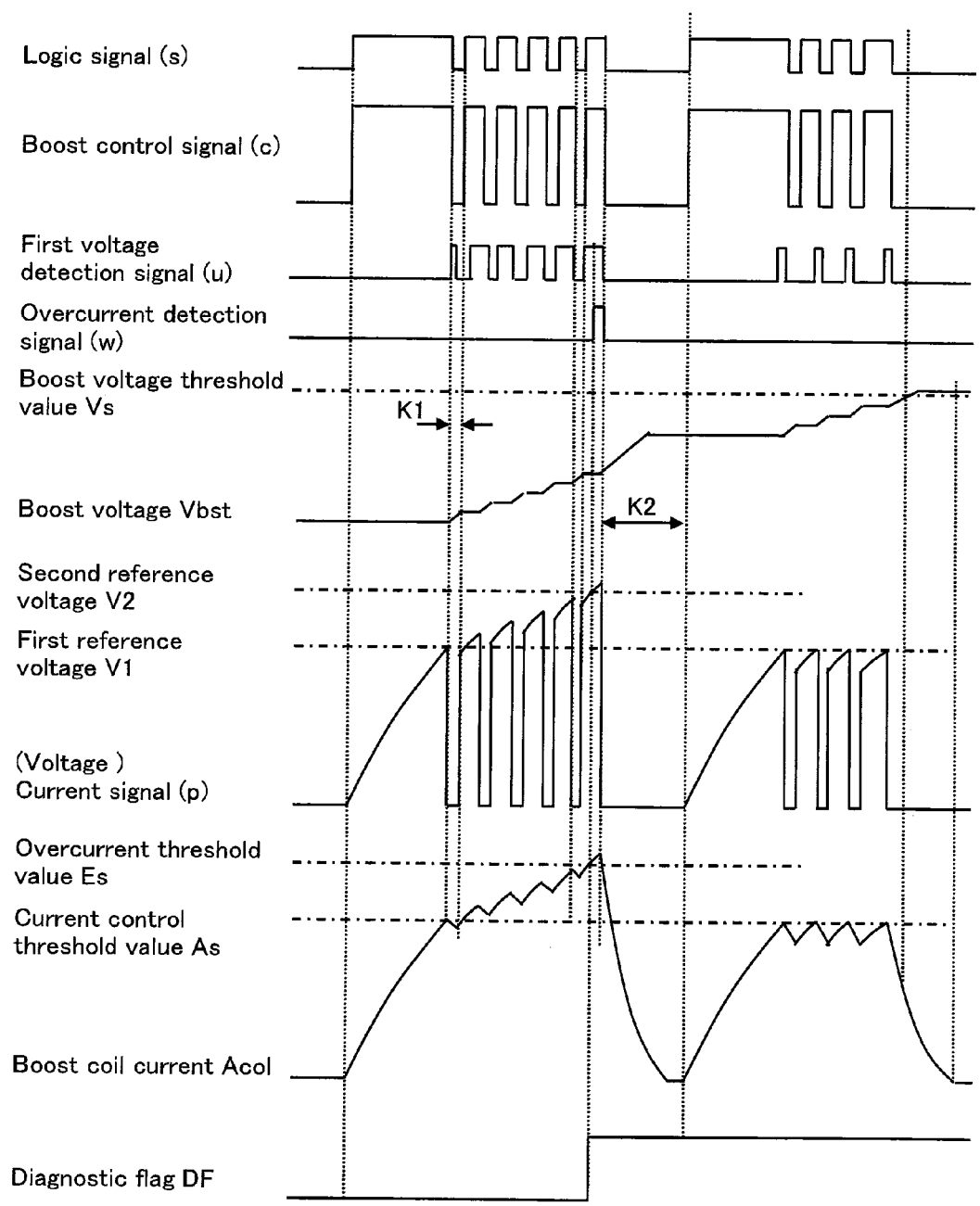
FIG. 11 is a time chart showing the operation of a boost power source device according to Embodiment 6.

FIG. 11 is a timing chart at the time of activation in a case where the present circuit is used. As discussed above, when, due to the boost control signal (c) generated at the boost control portion 129, the boost switch element 106 is turned on, and a current flows through the shunt resistor element 102, and the voltage indicated by the current signal (p) outputted by the current detection circuit 130 reaches the first reference voltage V1, the boost switch element 106 turns off for the duration of an off-time k3 that has been set.

Here, the gradient di/dt with which the current Aco1 flowing through the boost coil 101 drops after the boost switch element 106 is turned off is expressed in terms of the battery power-source voltage VB, a boost voltage Vbst, and inductance L of the boost coil 101 by the equation $di/dt = (VB - Vbst)/L$ However, because the boost voltage Vbst at the time of activation is smaller than the battery power-source voltage VB, di/dt at the time of activation is less than it would be under sufficiently boosted conditions.

Figure 10:
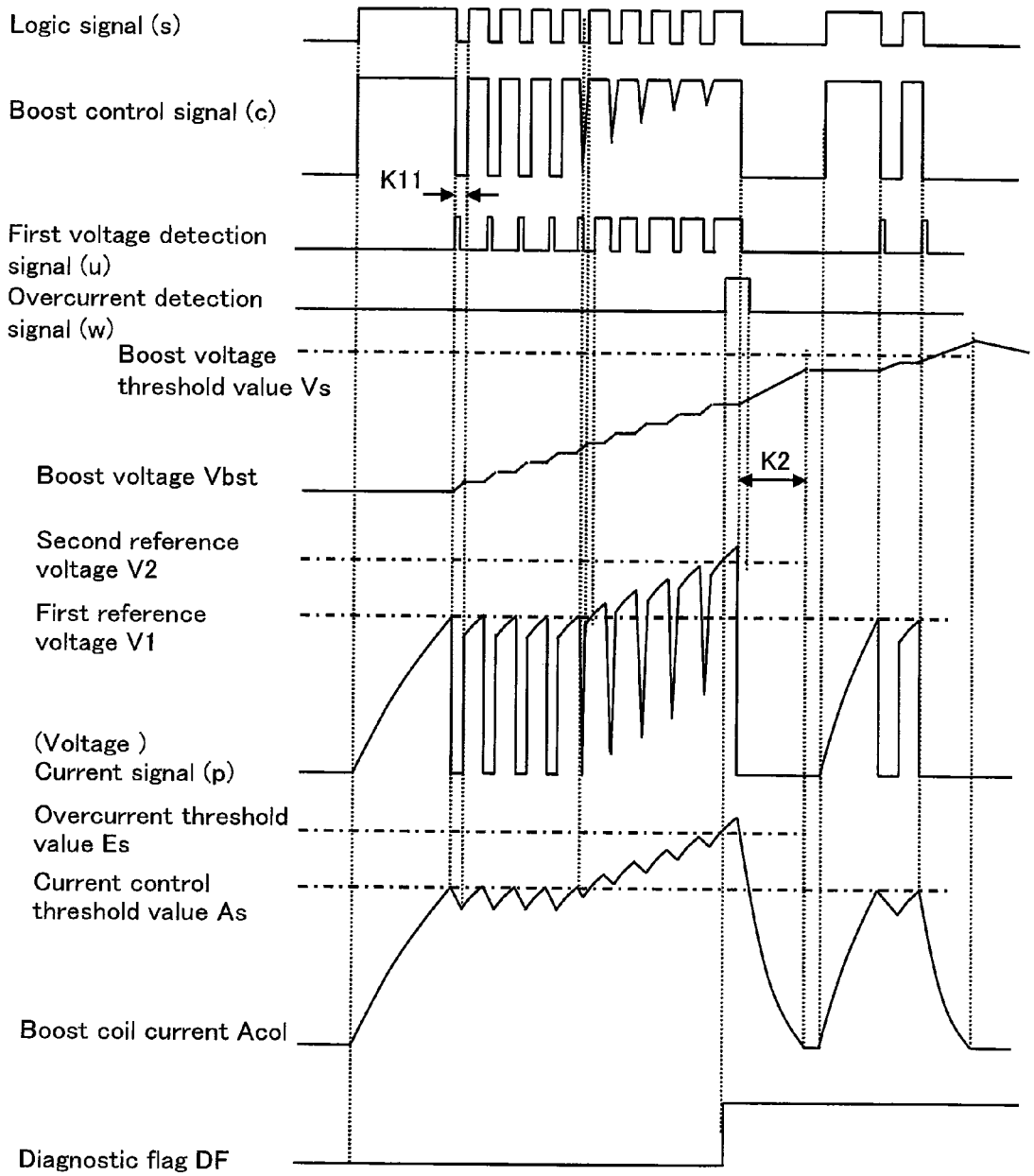
FIG. 10 is a time chart showing the operation of a boost power source device according to Embodiment 6.

Thus, with respect to the gradient of the drop in the current flowing through the boost coil 101 at the time of activation, even if the boost switch element 106 is turned off, the current Aco1 flowing through the boost coil 101 becomes less inclined to fall, and, as in FIG. 10, because a voltage higher than the first reference voltage V1 is outputted and the first voltage detection signal (u) outputted by the first voltage detection circuit 201 is switched to high, the logic signal (s) within the boost control portion 129 switches to low. However, the current flowing through the shunt resistor element 102 does not drop completely, and a large current eventually flows through the shunt resistor element 102. If a large current continues to flow, it leads to heat generation or damage in the boost switch element 106, the boost coil 101, and the shunt resistor element 102.

As such, the present embodiment is so configured that in the event that the detected voltage value reaches a second reference voltage V2, a second voltage detection circuit (overcurrent detection circuit) 202 outputs an output signal for a detection result that the current flowing through the boost coil is overcurrent, that is, an overcurrent detection signal (w), and this overcurrent detection signal (w) is sent to the determination circuit (switching determination circuit) 204. Further, the present embodiment is so configured that the overcurrent detection signal (w) is also sent to a diagnostic circuit 205, and this diagnostic circuit 205 outputs, depending on the output of the overcurrent detection signal (w), a signal DF representing the fact that the circuit is in an abnormal state.

In addition, the present embodiment is so configured that, based on a signal of the determination circuit 204, a logic signal generation circuit 211 of the boost control portion 129 generates a logic signal which serves as a base for the boost control signal (c), an analog signal generation circuit 212 generates the boost control signal (c), which is an analog signal that drives the boost switch element 106, from this logic signal, and outputs this generated boost control signal (c) to the boost switch element 106.

With such a configuration, if a large current were to flow through the shunt resistor element 102, once the voltage indicated by the current signal (p) detected at the current detection circuit 130 exceeds the first reference voltage V1 and reaches the second reference voltage V2, the current signal (p), which is an output of the current detection circuit 130, is inputted, and the overcurrent detection signal (w) is outputted from the second voltage detection circuit 202. The overcurrent detection signal (w) and the first voltage detection signal (u), which is an output of the first voltage detection circuit 201, are inputted to the determination circuit 204, and a current detection output signal (y) is inputted to the boost control portion 129 in accordance with the determination by the determination circuit 204.

If the overcurrent detection signal (w) is inputted to the determination circuit 204 at high (an output signal for a result of overcurrent), the determination circuit 204 prioritizes the overcurrent detection signal (w) and switches the set time from the normal off-time (the first set time) k1 to the off-time (the second set time) k2, which is an off-time for when there is overcurrent, and the off-time for the boost control signal (c) becomes longer than usual. Consequently, the current Ashu flowing through the shunt resistor element 102 drops. It is thus possible to prevent heat generation or damage in the boost switch element 106, the boost coil 101, and the shunt resistor element 102.

With such boost control at a time of overcurrent detection, it is possible to perform the switching of the boost switch element 106 using the boost control timing generation portion 122 shown in Embodiment 2.

In other words, as shown in FIGS. 10 and 11, during boost control, a boost operation is performed in accordance with, until overcurrent is detected, the off-time (the first set time) k1 that does not allow the boost coil current minimum value to drop to 0 A. When overcurrent is detected, the current flowing through the boost coil 101 is restricted (temporarily lowered) in accordance with the second set time k2, which is an off-time for causing the boost coil current minimum value to drop to 0 A.

It is noted that there is an analog delay in the actual current detection circuit 130, and the current signal (p) rises after a certain delay from the point at which the boost switch element 106 is turned on and a current flows through the shunt resistor element 102. In other words, even when the voltage indicated by the current signal (p) is higher than the first reference voltage V1 and has reached the predetermined voltage V2 at which overcurrent is detected, due to the analog delay, the first reference voltage V1 arrives first. Thus, at the determination circuit 204, a determination is made and the current detection output signal (y) is outputted before the overcurrent detection signal (w) is inputted. For this reason, even during overcurrent, the off-time for the boost control signal (c) will not switch, and a large current will keep flowing.

Figure 12:
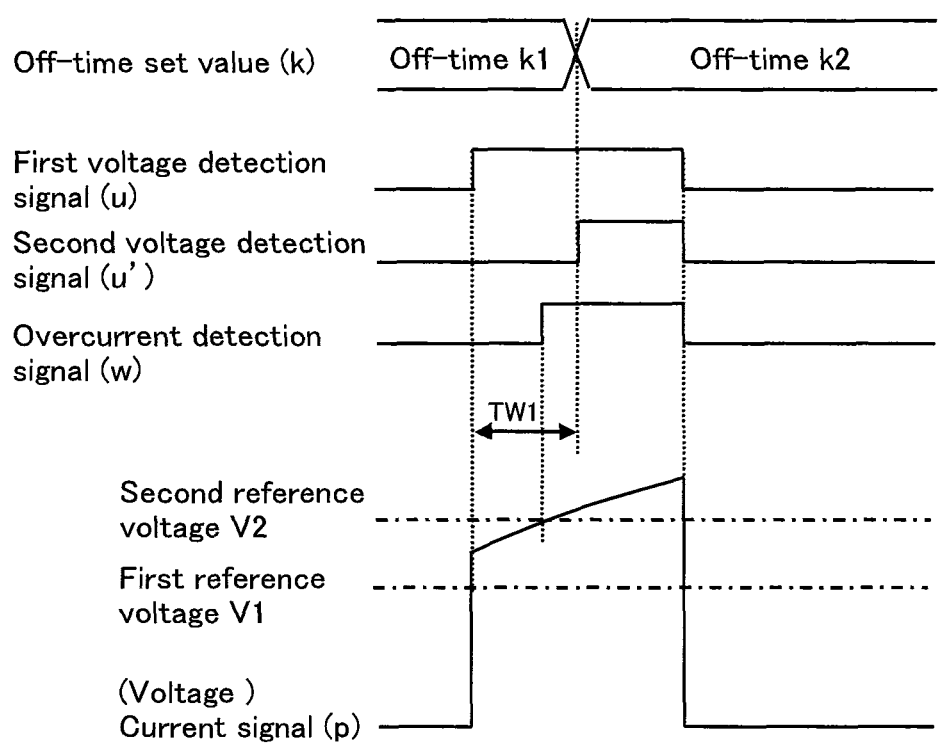
FIG. 12 is a time chart showing the operation of a boost power source device according to Embodiment 6.

As such, as shown in FIG. 12, in the event that the voltage indicated by the current signal (p) exceeds the first reference voltage V1, in order to coordinate the timings of the first voltage detection signal (u) and the overcurrent detection signal (w) by means of the wait time generation circuit (signal delay portion) 203 of a later stage of the outputted first voltage detection signal (u), a predetermined wait time Tw 1 is imparted. A wait state is thus created until the overcurrent detection signal (w) is outputted, and a determination is made based on the detection signals after the wait time Tw1 has elapsed, that is, a second voltage detection signal (u') and the overcurrent detection signal (w).

Further, this embodiment is of such a configuration that the overcurrent detection signal (w) outputted by the second voltage detection circuit 202 is inputted to the diagnostic circuit 205. Thus, when the overcurrent detection signal (w) is outputted from the second voltage detection circuit 202, the diagnostic circuit 205 brings the diagnostic flag DF to a high level, and it becomes possible to output an anomaly signal from the current monitor circuit 126.

Embodiment 7

Figure 13:
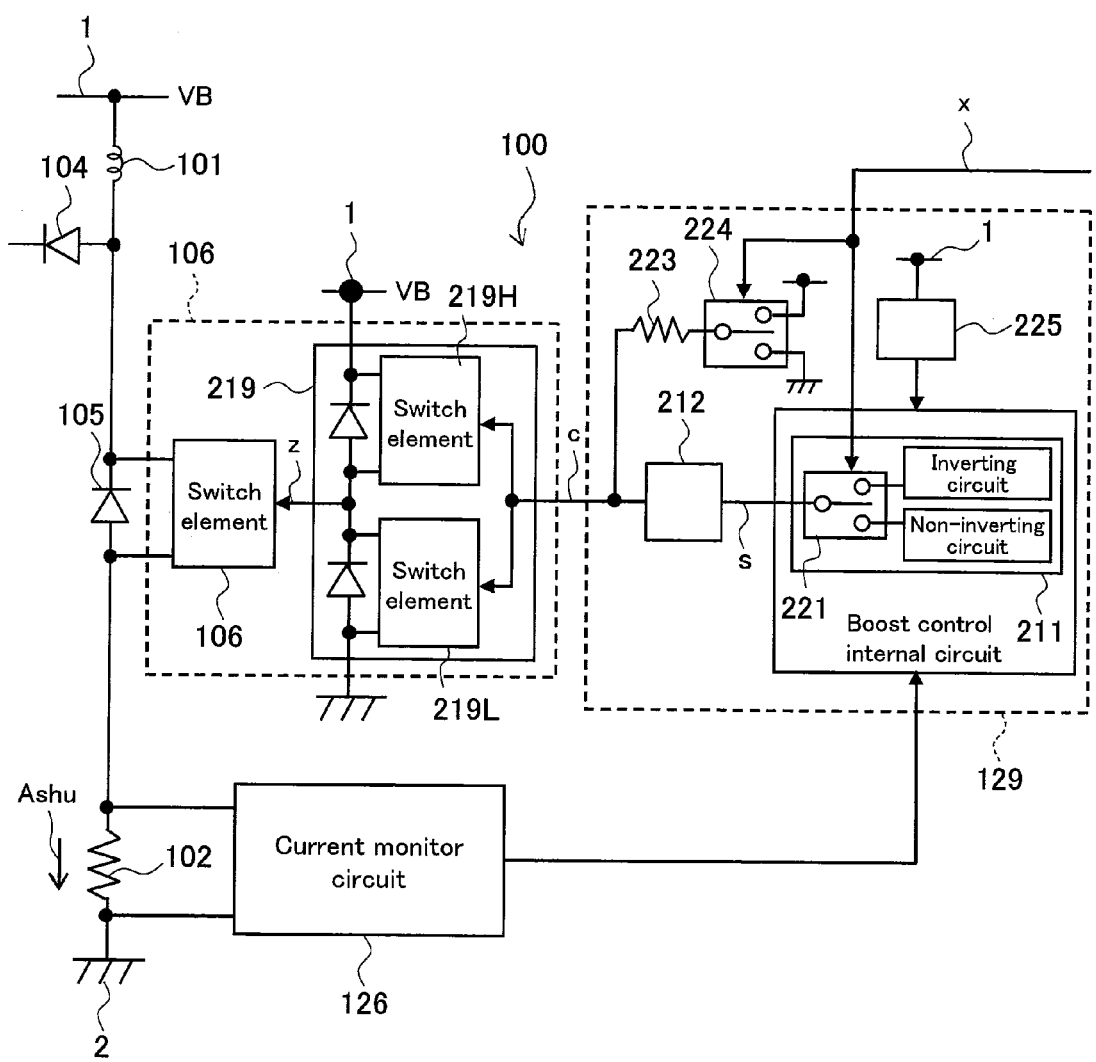
FIG. 13 is a block diagram showing Embodiment 7 of an internal combustion engine controller (a boost power source device) according to the present invention.
Figure 14:
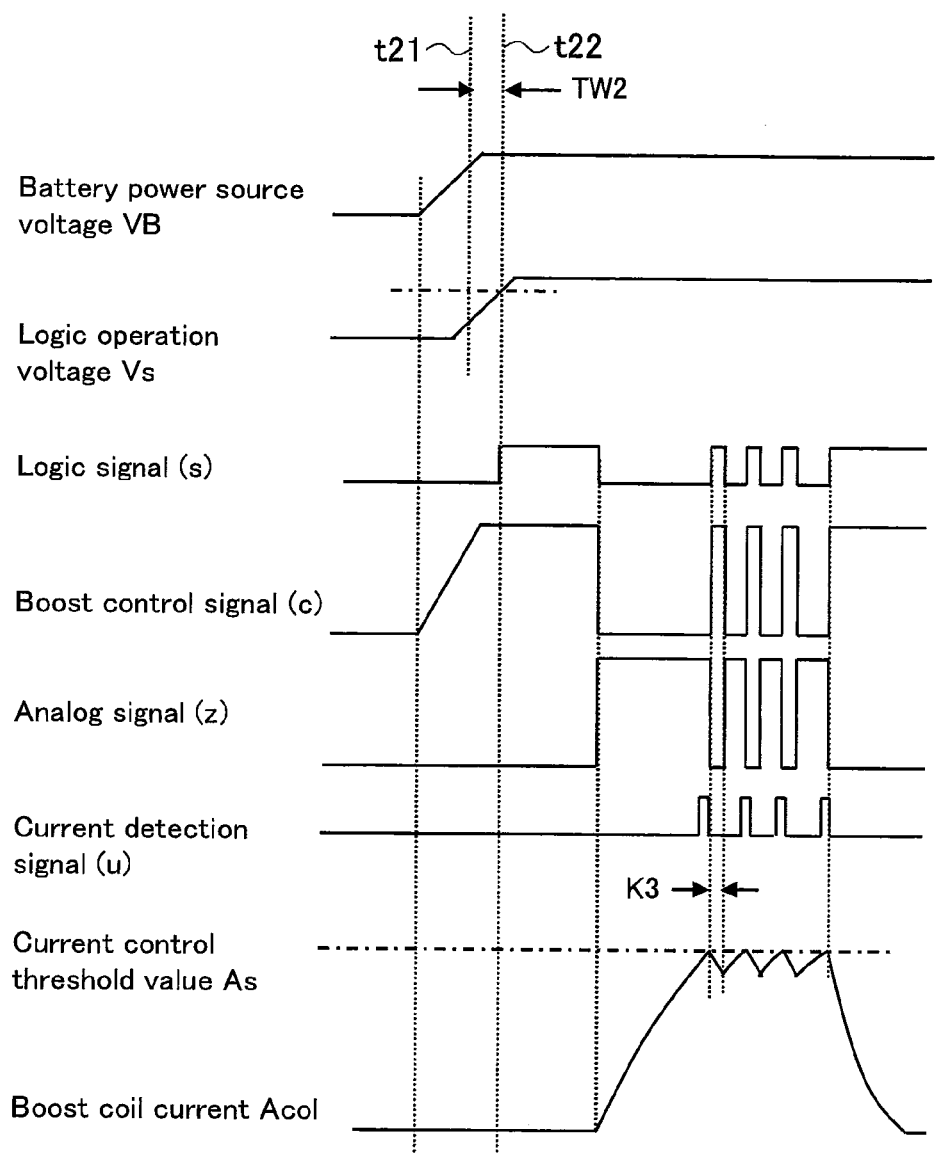
FIG. 14 is a time chart showing the operation of a boost power source device according to Embodiment 7.
Figure 15:
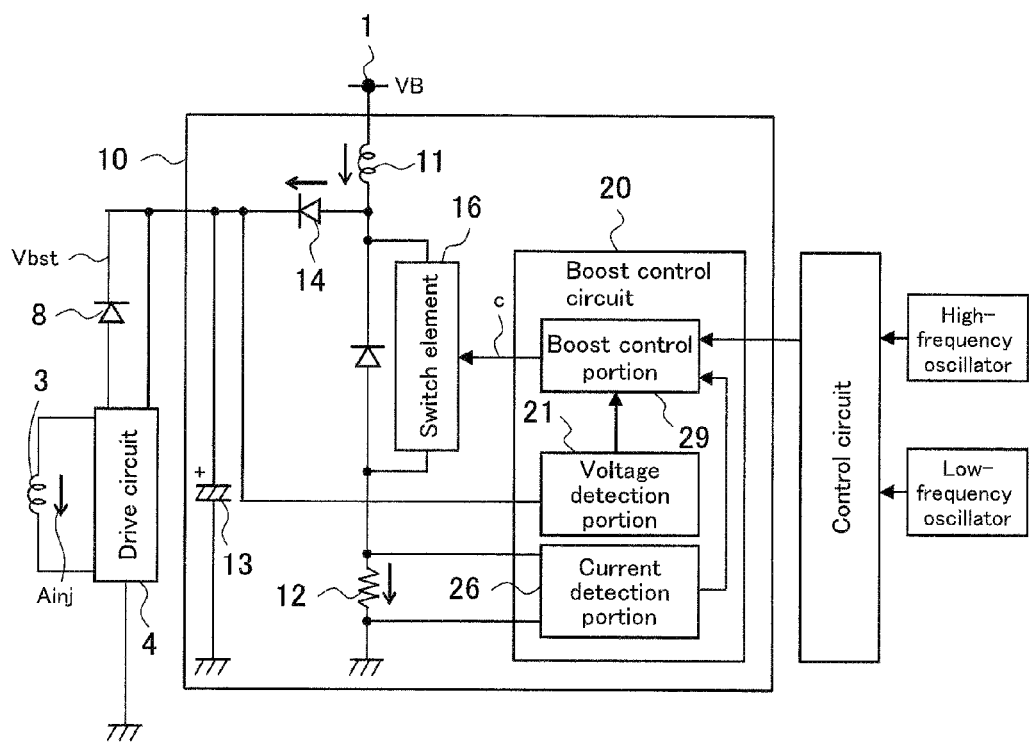
FIG. 15 is a block diagram showing a conventional example of an internal combustion engine controller (a boost power source device).
Figure 16:
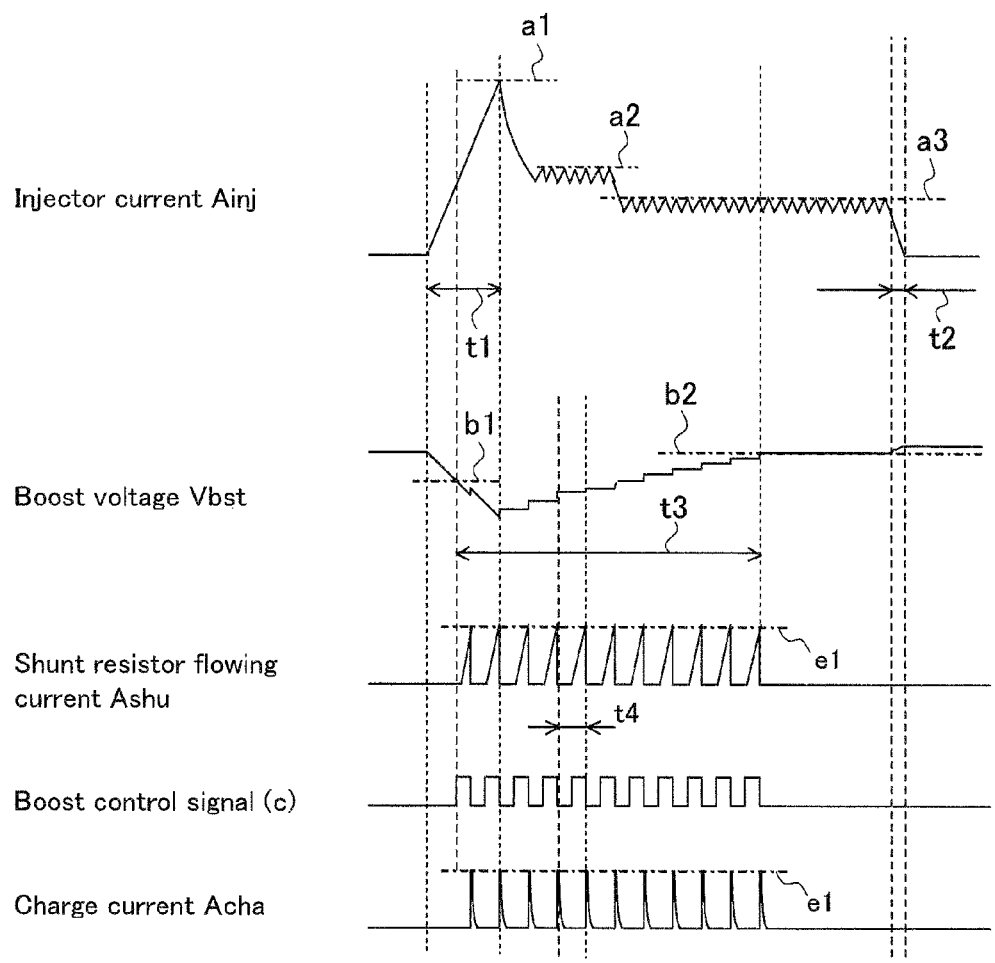
FIG. 16 is a time chart showing the operation of the internal combustion engine controller (the boost power source device) of the conventional example.

The main portion of a boost power source device according to Embodiment 7 is described with reference to FIG. 13 and FIG. 14. As shown in FIG. 13, in the present embodiment, a switch element 219 is provided before the boost switch element 106, that is, between the boost switch element 106 and the boost control portion (drive signal generation circuit) 129. The drive signal generation circuit 129 is such a circuit as that described above that generates a pulsed output signal for switching the boost switch element 106.

The switch element 219 constitutes a push-pull circuit with switch elements 219H and 219L provided on the high side and the low side, respectively. As the switch element 219, a Pch MOS on the high side and an Nch MOS on the low side, or npn and pnp bipolar transistors or IGBTs are used. For this element configuration, one that is optimal in accordance with the boost circuit specification need only be selected and configured.

The boost control portion 129 comprises the logic signal generation circuit 211 including an inverting circuit and a non-inverting circuit, and is capable of, by means of a logic signal switching portion (switching circuit) 221, performing inversion and non-inversion of an inputted pulse signal from the current monitor circuit 126. In other words, as a result, the boost control signal, which is an output signal of the drive signal generation circuit, is switched to inversion or non-inversion. The logic signal switching portion 221 can be switched via an external switch signal (x). It is noted that in cases where the switch element 219 is not implemented, the logic signal switching portion 221 may sometimes not be used.

The shunt resistor flowing current Ashu flowing through the shunt resistor element 102 is detected by the current monitor circuit 126, and the logic signal (s) based on such shunt resistor flowing current Ashu, that is, an output signal of the comparator 131 (see FIG. 1), is inputted to the boost control portion 129. The logic signal (s) inputted to the boost control portion 129 is handed to the analog signal generation circuit 212 via the logic signal generation circuit 211 comprising an internal circuit of the boost control portion 129. The analog signal generation circuit 212 converts the logic signal (s) to the boost control signal (c) and inputs the boost control signal (c) to the boost switch element 106.

As discussed above, in attempting to realize such a regulated current control scheme as that of the present circuit, that is, in order to maintain the shunt resistor flowing current Ashu flowing through the shunt resistor element 102 at some constant value, the off-time for the boost control signal (c) needs to be shortened. There is a tendency for the drive switching frequency of the boost switch element 106 to increase, causing the heat generated by the boost control portion 129 to increase, when the off-time is shortened.

In respect thereof, as shown in FIG. 13, by providing the boost switch element 106 and the switch element 219 in series, it is possible to cause heat generation at the switch element 219, thus reducing the amount of heat generation involving the boost control portion 129. In this case, the boost control signal (c), which is an output of the boost control portion 129, becomes a signal that is the inverse of the original signal. For this reason, the logic signal switching portion 221 is provided within the logic signal generation circuit 211 to perform the inversion or non-inversion of the logic signal (s).

In general, the power source that causes the logic signal generation circuit 211 to operate is of a voltage (logic operating voltage) that is lower than the voltage VB of the battery power source 1, and this voltage is generated by a logic operating voltage generation circuit 225. Because the logic operating voltage is generated from the battery power-source voltage, there arises a delay between the point at which the battery power source 1 is activated and the point at which the logic operating voltage is generated by the logic operating voltage generation circuit 225. In other words, as shown in FIG. 14, there arises a delay time TW2 of from a logic operable timing t21 up to a logic operation start timing t22.

However, under conditions where the above-described logic signal switching portion 221 is provided and the logic signal (s) inverted, the boost control signal (c) remains low for the duration of the above-mentioned delay time TW2, and there is a possibility that a large current may flow through the boost switch element 106.

As such, as shown in FIG. 13, by adding a pull-up/pull-down resistor element 223 and a pull-up/pull-down switching circuit 224 at a stage subsequent to the analog signal generation circuit 212, and by pulling up or pulling down the boost control signal (c) (an output signal of the drive signal generation circuit) synchronously with the logic signal generation circuit 211 when switching takes place between inversion and non-inversion, a large current is prevented from flowing at the time of activation.

A boost power source device according to the embodiments described above may be configured with any of the following: one in which each function is enabled by an integrated circuit configuration; one in which each function is enabled by an external circuit; and one in which each function is enabled by software through the execution of a computer program.

Although embodiments of the present invention have thus been described in detail with reference to the drawings, specific configurations are by no means limited to such embodiments. Design modifications made within a scope that does not depart from the spirit of the present invention are to be included in the present invention.

An internal combustion engine controller according to the present invention is suitable as a power source device for driving a load using a high voltage obtained by boosting a battery voltage with respect to cars, motorcycles, agricultural machinery, machine tools, ships, etc., that run on gasoline, diesel, etc. In particular, it may be used as a boost power source device for in-cylinder direct injection injectors.

The in-cylinder direct injection injector is not limited to one comprising an electrically inductive component powered by a solenoid, and may be applied in a scheme in which an in-cylinder direct injection injector comprising an electrically capacitive component powered by a piezoelectric element is driven, and in which the high voltage that has dropped due thereto is replenished by a switching operation of a boost circuit.

What is claimed is:

1. An internal combustion engine controller, comprising:
    a boost coil configured to boost a voltage of a battery power source;
    a boost switch element configured to switch between causing a current to flow and stopping a current from flowing through the boost coil; and
    a current detection portion configured to detect a current flowing through the boost switch element, wherein
    boost control is effected by repeating the switching of the boost switch element,
    the voltage boosted at the boost coil is charged to a boost capacitor via a diode, and
    during the boost control, the internal combustion engine controller makes the boost switch element stop the current flowing through the boost coil when the detected current reaches a switching stop current value and, after a predetermined set time has elapsed from the point at which current flow is stopped, makes the boost switch element cause a current to flow through the boost coil.

2. The internal combustion engine controller according to claim 1, further comprising a selector switch configured to change the switching stop current value.

3. The internal combustion engine controller according to claim 1, further comprising a set time changing portion configured to change the set time.

4. The internal combustion engine controller according to claim 3, wherein the set time changing portion comprises:
    a first time setting portion configured to set the set time to a first set time from the point at which current flow is stopped, the first set time being a time in which the current flowing through the boost coil does not drop to zero amperes;
    a second time setting portion configured to set the set time to a second set time from the point at which current flow is stopped, the second set time being a time in which the current flowing through the boost coil drops to zero amperes; and
    a time switching portion configured to switch between the first set time and the second set time.

5. The internal combustion engine controller according to claim 3, wherein the set time changing portion changes the set time based on a low-frequency clock signal or a high-frequency clock signal.

6. The internal combustion engine controller according to claim 1, further comprising a voltage detection portion configured to detect the voltage boosted at the boost coil, wherein the internal combustion engine controller starts the boost control when the detected voltage drops to reach a predetermined boost start voltage, and terminates the boost control when the detected voltage rises to reach a predetermined boost stop voltage.

7. The internal combustion engine controller according to claim 6, further comprising a voltage selector switch configured to change the value of the boost stop voltage.

8. The internal combustion engine controller according to claim 1, wherein a plurality of the boost switch elements are connected in parallel.

9. The internal combustion engine controller according to claim 4, further comprising a protection circuit configured to limit the current flowing through the boost coil by controlling the switching of the boost switch element based on the detected current.

10. The internal combustion engine controller according to claim 9, wherein the protection circuit comprises an overcurrent detection circuit configured to detect, based on the detected current, whether or not the current flowing through the boost coil is overcurrent, and the switching of the boost switch element is controlled based on a detection result of the overcurrent detection circuit.

11. The internal combustion engine controller according to claim 10, wherein if the overcurrent detection circuit detects overcurrent, the time switching portion switches the set time from the first set time to the second set time.

12. The internal combustion engine controller according to claim 11, further comprising:
    a detection circuit configured to detect whether or not the detected current has reached the switching stop current value;
    a switching determination circuit configured to determine whether or not to switch the set time based on an output signal of the detection circuit and an output signal of the overcurrent detection circuit; and
    a wait time generation circuit configured to input the output signal from the detection circuit to the switching determination circuit after delaying an input timing of the output signal from the detection circuit by a predetermined length of time, wherein the time switching portion performs the switching of the set time based on a determination result of the switching determination circuit.

13. The internal combustion engine controller according to claim 10, further comprising a diagnostic portion configured to output a signal indicating an anomaly in the internal combustion engine controller if the overcurrent is detected.

14. The internal combustion engine controller according to claim 1, further comprising:
 a drive signal generation circuit configured to generate a pulsed output signal for performing the switching of the boost switch element; and
 a switch element configured to suppress heat generation provided between the boost switch element and the drive signal generation circuit.

15. The internal combustion engine controller according to claim 14, further comprising a switching circuit configured to switch the output signal of the drive signal generation circuit to an inverted state or a non-inverted state.

\* \* \* \* \*